US010498597B2

(12) United States Patent
Allen

(10) Patent No.: US 10,498,597 B2
(45) Date of Patent: *Dec. 3, 2019

(54) DEPLOYING AND MONITORING MULTIPLATFORM CLOUD-BASED INFRASTRUCTURES

(71) Applicant: VMWARE, INC., Palo Alto, CA (US)

(72) Inventor: Paul Dennis Allen, Bellevue, WA (US)

(73) Assignee: VMware, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/919,010

(22) Filed: Mar. 12, 2018

(65) Prior Publication Data

US 2018/0205604 A1  Jul. 19, 2018

Related U.S. Application Data

(63) Continuation of application No. 15/594,483, filed on May 12, 2017, now Pat. No. 9,923,765.

(Continued)

(51) Int. Cl.
*H04L 12/24* (2006.01)
*H04L 12/26* (2006.01)

(52) U.S. Cl.
CPC ........ *H04L 41/0806* (2013.01); *H04L 41/046* (2013.01); *H04L 41/0813* (2013.01);
(Continued)

(58) Field of Classification Search
CPC .............. H04L 41/046; H04L 41/0806; H04L 41/0813; H04L 41/0826; H04L 41/0856;
(Continued)

(56) References Cited

U.S. PATENT DOCUMENTS

2012/0185913 A1*  7/2012  Martinez ................. G06F 9/455
                                                              726/1
2012/0239739 A1*  9/2012  Manglik ............... G06F 9/5077
                                                              709/203

(Continued)

FOREIGN PATENT DOCUMENTS

WO       2013184134 A1     12/2013

OTHER PUBLICATIONS

International Search Report, PCT/US2017/032741, dated Jul. 24, 2017, 14 pgs.

*Primary Examiner* — Michael C Lai
(74) *Attorney, Agent, or Firm* — Loza & Loza, LLP

(57) ABSTRACT

Embodiments are directed towards managing computer applications. A configuration package may be provided to provision a cloud service stack on a cloud platform such that the cloud service stack corresponds to a main stack model. If a monitoring engine identifies inconsistencies between the cloud service stack and the main stack model, a deployment engine may be provided to traverse the main stack model such that the deployment engine may visit each of one or more stack model entities included in the main stack model. Then an updated configuration package may be provided for the cloud platform based on the traversal. And, the updated configuration package may be provided to the cloud platform to re-provision the cloud service stack.

21 Claims, 17 Drawing Sheets

Related U.S. Application Data

(60) Provisional application No. 62/339,702, filed on May 20, 2016.

(52) U.S. Cl.
CPC ...... H04L 41/0816 (2013.01); H04L 41/0826 (2013.01); H04L 41/0856 (2013.01); H04L 41/0866 (2013.01); H04L 41/145 (2013.01); H04L 43/08 (2013.01)

(58) Field of Classification Search
CPC ............... H04L 41/0866; H04L 41/145; H04L 41/0816; H04L 43/08
See application file for complete search history.

(56) References Cited

U.S. PATENT DOCUMENTS

| | | | | |
|---|---|---|---|---|
| 2012/0271874 A1* | 10/2012 | Nugent | ............... | H04L 41/5045 |
| | | | | 709/201 |
| 2013/0281049 A1* | 10/2013 | Lee | ....................... | H04W 24/00 |
| | | | | 455/405 |
| 2014/0279201 A1* | 9/2014 | Iyoob | ................. | G06Q 30/0631 |
| | | | | 705/26.7 |
| 2016/0381151 A1* | 12/2016 | Apte | ....................... | H04L 67/16 |
| | | | | 709/202 |

\* cited by examiner

US 10,498,597 B2

DEPLOYING AND MONITORING MULTIPLATFORM CLOUD-BASED INFRASTRUCTURES

CROSS-REFERENCE TO RELATED APPLICATIONS

This application is a continuation of U.S. patent application Ser. No. 15/594,483, filed May 12, 2017 (issued as U.S. Pat. No. 9,923,765), which claims benefit of the U.S. Provisional Application No. 62/339,702, filed May 20, 2016, which are both incorporated by reference herein in their entirety.

TECHNICAL FIELD

This invention relates generally to managing cloud based computing environments, and more particularly, but not exclusively, to deploying and maintaining applications in cloud based environments.

BACKGROUND

Increasingly, enterprises and organizations are moving more of their information technology infrastructure into cloud-based computing environments. Companies may be moving internal resources and applications, such as, email, web servers, customer service tools, shared storage, backup services, and so on, into cloud computing environments. Also, service providers may be hosting entire software-as-a-service offerings in cloud-based environments. Employing cloud-based environments may provide various well-known benefits, such as, location transparency, on demand scaling, or the like. However, deploying complex applications in the cloud may require significant configuration and development to take advantage of a particular cloud-based environment. Further, different cloud environment providers may require different configurations. Also, since developers of cloud services may employ continuous deployment methodologies and distributed workforces, maintaining consistent configurations for a complex cloud service may be difficult. Thus, it is with respect to these considerations and others that the invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following detailed description of embodiments of the invention, which is to be read in association with the accompanying drawings, wherein.

DETAILED DESCRIPTION OF EMBODIMENTS OF THE INVENTION

Figure 1:
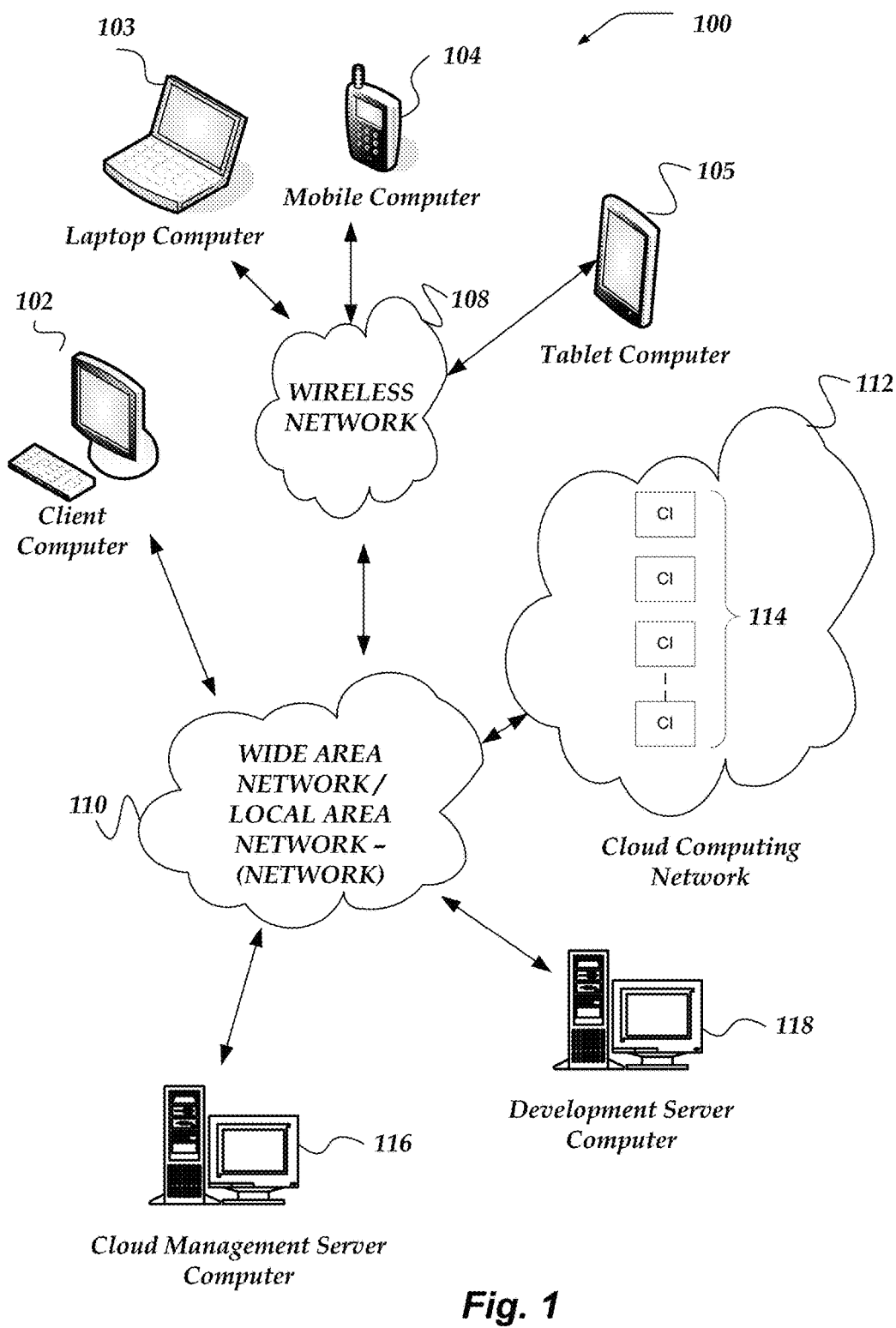
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term "cloud network" refers to cloud based networked computing environments that usually enable location transparent access to services and/or applications. Cloud networks may be comprised of one or more physical network computers. These physical network computers may be coupled using one or more networks and/or arranged into clusters. In some cases, users may access cloud networks over public networks, such as, the internet. Cloud networks generally made available to the public are sometimes called public cloud networks. In other cases, access to a cloud network may be restricted. This type of cloud network configuration may be called a private cloud network. Cloud networks that include private portions and public portions may be referred to as hybrid cloud networks.

Cloud networks may comprise numerous physical computers arranged such that the number and arrangement of the physical computers and devices is hidden from the users of a cloud network. Cloud network infrastructure, the details and architecture of which may vary depending on the cloud network provider, automatically provision and deploy applications and services onto the physical hardware transparent to the users of cloud services.

Cloud networks are often arranged to deploy multiple virtual machines that are dynamically provisioned on physical computers to support the various applications and services that are operative in the cloud network. The policy for dynamically provisioning resources in a cloud network may be determined based on configuration information associated with users and/or owners of the applications and/or services that are operative in the cloud network. Cloud networks may be configured to automatically and rapidly scale computing resources in response to changing usage loads.

As used herein, the terms "cloud platform," "cloud computing platform," "cloud storage platform" refer a cloud network or cloud computing environment that maybe provided by a vendor or custom data center. The term refers to a cloud network offering that includes/provides various network, computer, or storage resources as part of a cloud computing infrastructure. While different cloud platforms may provide similar resources that may require different configurations to provision cloud service stacks. For example, well-known cloud platforms include, Microsoft's Azure, Amazon's AWS, Rackspace's Public Cloud, or the like. Likewise, a cloud platform may be custom or private cloud computing environment that may be running in a customer's data center.

As used herein the term "cloud instance" refers to an addressable (identifiable) and distinct allocation of computing resources in a cloud network. In many embodiments, cloud instances are virtual servers implemented using one or more virtual machine technologies. In some embodiments, cloud instances may be optimized for particular computing tasks. For example, cloud instances arranged for general purpose computing tasks may be configured differently than cloud instances arranged for graphic processing, database processing, or data storage.

As used herein, the terms "cloud service stack," or "service stack" refer to network configurations, applications, services, or the like, that are deployed and operative in a cloud network. A cloud service stack may include different sub-applications and/or sub-services. For example, a cloud service stack may be an entire system, such as, an e-commerce system that includes, many web servers, many databases, inventory management, customer service tools, performance monitoring, network configuration, traffic management policies, name services, customer profiles, or the like. Likewise, a cloud service stack may refer to single application, such as, a service that provides stock prices when provided a stock symbol. Accordingly, as used herein, a cloud service stack may comprise the entire system that a user or organization may want to configure, deploy, or operate in a cloud based computing environment.

As used herein, the term "stack configuration" refers to configuration information that defines a cloud service stack and/or a portion of a service stack. The stack configuration may include information necessary for deploying/maintaining a cloud service stack in a cloud computing environment.

As used herein the term "configuration package" refers to a set of stack configuration information that corresponds to a stack model. In some embodiments, a deployment engine may process a stack model to produce a configuration package for a particular cloud platform. The configuration stack may be used to provision a cloud service stack that corresponds to the stack model on the particular cloud platform.

As used herein, the terms "stack resource," "cloud resource," and "resource" refers to compute, networking, or storage features offered by a cloud platform. Resources may include cloud instances, virtual machines, route tables, virtual load balances, networks, users, processes, programs, databases, application servers, traffic management devices, or the like. In some cases, resources may be virtualized by the cloud platform. In other cases, some resources may be actual hardware devices/computers.

As used herein, the term "stack model" refers to a cloud platform independent representation of cloud service stack. Stack models may define the resources, configurations, or the like, for different parts or features of a cloud service stack. Two or more stack models may be combined together into a single main stack model that represents the whole cloud service stack. Stack models may be hierarchal and may include one or more stack model entities. Some stack model entities may represent the various resources of the may be provisioned for a cloud service stack. In some cases, the stack model entities may represent a root of another stack model that may be included in the main stack model. Also, in some cases, the stack model entities may represent resources and/or configuration that may override information from other included stack models.

At used herein, the term "main stack model" refers a stack model that includes other stack models. In some cases, the main stack model may represent the entire cloud service stack such that it includes one or more other stack models that may be used to define portions of the cloud service stack.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing computer applications. In at least one of the various embodiments, a configuration package may be provided to provision a cloud service stack on a cloud platform such that the cloud service stack corresponds to a main stack model that may be stored in a stack model repository. In at least one of the various embodiments, providing the configuration package may include: provisioning one or more cloud instances such that the one or more cloud instances include a cloud management agent; employing the cloud management agent to monitor one or more metrics of the one or more cloud instances; and employing the cloud management agent to perform configuration actions on the one or more cloud instances.

In at least one of the various embodiments, if a monitoring engine identifies one or more inconsistencies between the cloud service stack and the main stack model, additional actions may be performed, including: in at least one of the various embodiments, a deployment engine may be provided to traverse the main stack model such that the deployment engine may visit each of one or more stack model entities that may be included in the main stack model; in at least one of the various embodiments, an updated configuration package may be provided for the cloud platform based on the traversal of the one or more stack model entities; in at least one of the various embodiments, the updated configuration package may be provided to the cloud platform such that the updated configuration package may be used to re-provision the cloud service stack.

In at least one of the various embodiments, providing the updated configuration package may include: assembling instructions that may be specific to the cloud platform based on one or more definitions that may be included in the one or more stack model entities; and providing one or more portions of the configuration package based on the assembled instructions.

In at least one of the various embodiments, if the deployment engine visits a stack model entity that may be a root of another stack model, the deployment engine may be employed to traverse the other stack model. And, the updated configuration package may be modified based on the traversal of the other stack model.

In at least one of the various embodiments, a local copy of the main stack model may be provided to a user. And, the user may be enabled to modify the local copy of the main stack model. Further, the user's local copy of the main stack model may be provided to the stack model repository such that modifications made to the user's local copy of the main stack model may be merged into the main stack model.

In at least one of the various embodiments, the monitoring engine may be employed to compare the cloud service stack resource utilization with current prices of the cloud platform. In at least one of the various embodiments, if the comparison identifies one or more cost optimizations, a modeling engine may be employed to modify the main stack model based on the one or more cost optimizations.

In at least one of the various embodiments, the monitoring engine may be employed to audit content of the cloud service stack. In at least one of the various embodiments, if the audit identifies that one or more defined conditions may be met, one or more notifications to alert one or more users may be provided.

In at least one of the various embodiments, if the deployment engine visits a stack model entity that may be an override stack model entity, the deployment engine may modify the updated configuration package by adding information or replacing information based on the override stack model entity.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, one or more cloud networks, such as, cloud network 112, one or more cloud instances, such as cloud instances 114, Cloud Management Server Computer 116, Development Server Computer 118, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, cloud management server computer 116, development server computer 118, cloud instances 114, or other computers.

Client computers 102-105 may further be configured to include a client application that enables an end-user to log into an end-user account that may be managed by another computer, such as cloud management server computer 116, development server computer 118, cloud instances 114, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like.

Wireless network 108 may be configured to couple client computers 103-105 and its components with network 110 and/or cloud network 112. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, cloud management server computer 116, development computer 118, client computers 102-105, cloud instance 114, or the like, through wireless network 108, cloud network 112, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Cloud network 112 may be a public or private cloud network. Cloud network 112 may comprise multiple physical network computers, interconnected by one or more networks, such as, networks similar to and/or including network 108 and/or wireless network 110. Cloud network 112 may enable and/or provide one or more cloud instances. For example, cloud instances 114 may be operative in cloud network 112. The number and composition of cloud instances 114 may be vary depending on the demands of individual users, cloud network arrangement, operational loads, performance considerations, application needs, operational policy, or the like. In at least one of the various embodiments, the number of cloud instances may be automatically increased or decreased in response to demand variance for services provided by cloud instances running in the cloud network.

Cloud instances 114 may be virtualized embodiments of network computer 300. Further, one or more cloud instances 114 may be operative on physical network computers, such as network computer 300. Cloud instances that may be operative on a network computer, such as, network computer 300 may be managed by a hypervisor executing on the physical network computer. Further, cloud instances 114 may be arranged to use various computer operating systems.

And, cloud instances running different computer operating systems may be operative in the same cloud network.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

Although FIG. 1 illustrates cloud management server computer 116, development computer 118 each as a single computer, the innovations and/or embodiments are not so limited. For example, one or more functions of cloud management server computer 116, development server computer 118, or the like, may be distributed across one or more distinct network computers. Moreover, cloud management server computer 116, or development server computer 118 are not limited to a particular configuration such as the one shown in FIG. 1. Thus, in one embodiment, cloud management server computer 116, or development server computer 118 may be implemented using a plurality of network computers. In other embodiments, server computers may operate as a plurality of network computers within a cluster architecture, a peer-to-peer architecture, or the like. Further, in at least one of the various embodiments, cloud management server computer 116, or development server computer 118 may be implemented using one or more cloud instances in one or more cloud networks. Accordingly, these innovations and embodiments are not to be construed as being limited to a single environment, and other configurations, and architectures are also envisaged.

Illustrative Client Computer

Figure 2:
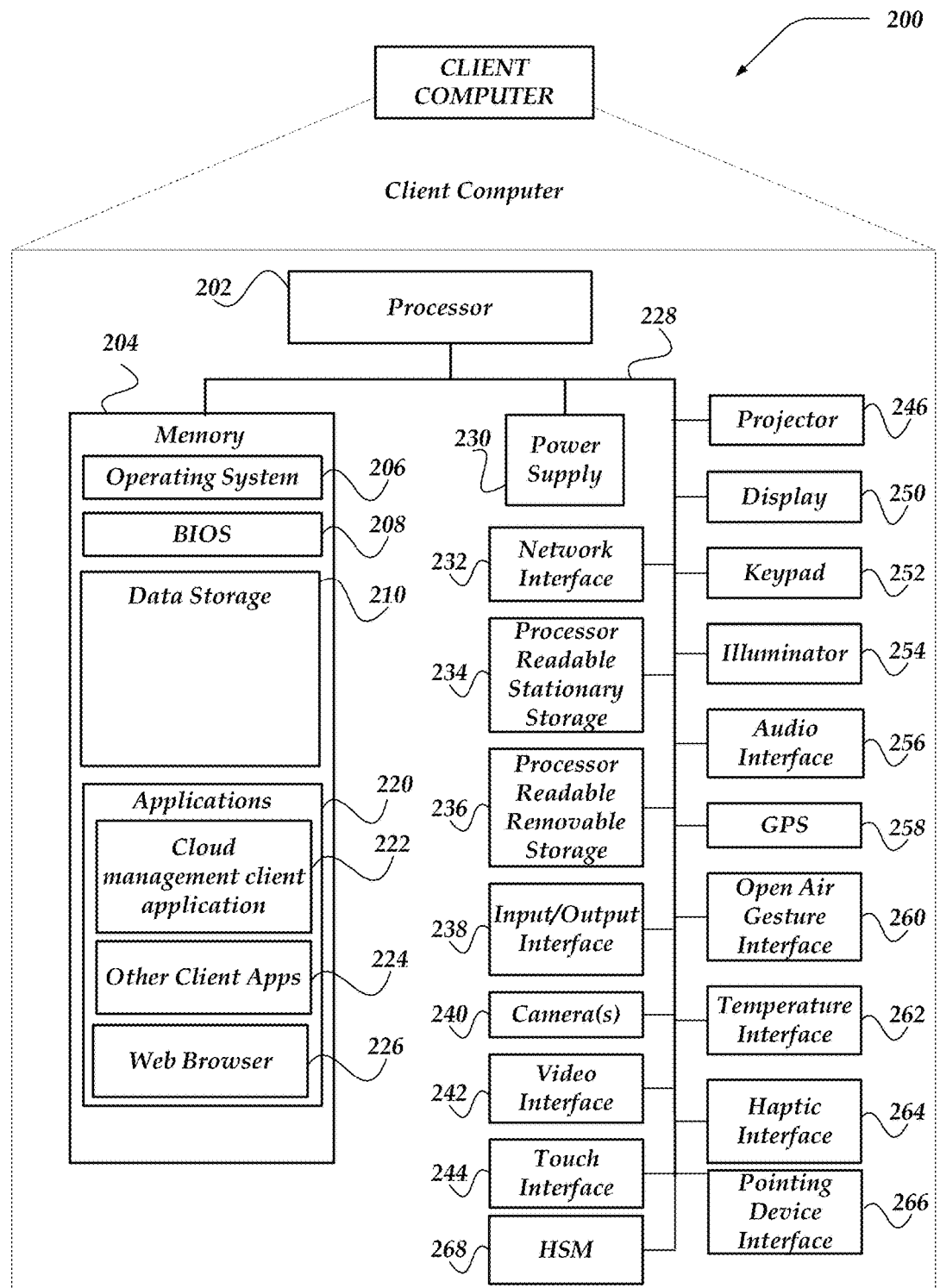
FIG. 2 shows a logical schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input and/or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, cloud management client application 222, other client applications 224, web browser 226, or the like. Client computers may be arranged to exchange communications, such as, queries, searches, messages, notification messages, event messages, alerts, performance metrics, log data, API calls, or the like, combination thereof, with application servers, cloud instances, cloud management servers, or the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of one or more CPUs, such as, Application Specific Integrated Circuits (ASICs), Field Programmable Gate Arrays (FPGAs), Programmable Array Logic (PALs), or the like, or combination thereof. The embedded logic hardware devices may directly execute embedded logic to perform actions. Also, in one or more embodiments (not shown in the figures), client computer 200 may include one or more hardware microcontrollers instead of one or more CPUs. In at least one embodiment, the one or more microcontrollers may directly execute their own embedded logic to perform actions and access their own internal memory and its own external Input and Output Interfaces (e.g., hardware pins and/or wireless transceivers) to perform actions, such as System On a Chip (SOC), or the like.

Illustrative Network Computer

Figure 3:
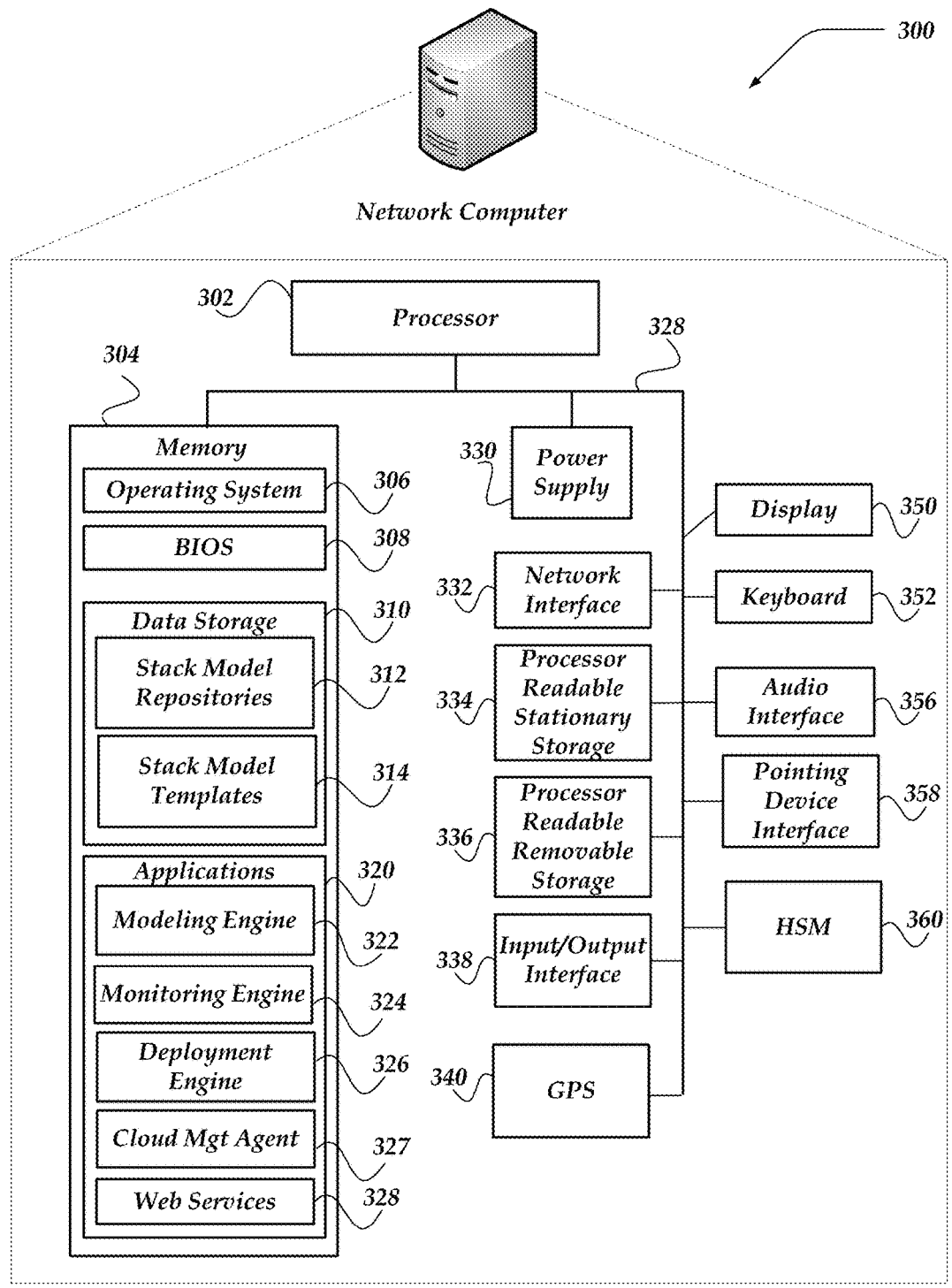
FIG. 3 illustrates a logical schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of cloud management server computer 116, development server computers 118, or the like.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to network computer 300. Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In at least one embodiment, however, network computer 300 may, through other components, provide other information that may be employed to determine a physical location of the client computer, including for example, a Media Access Control (MAC) address, IP address, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of methods, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by one or more processors, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, stack model repositories 312, stack model templates 314, or the like. Stack model repositories 312 may be a data store that contains stack model data that may be used generate one o more cloud service stacks. And, stack model templates 314 may include one or more pre-made configurations for full or partial generation of cloud service stacks that may be intended for re-use by more than one partner/customer.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include modeling engine 322, monitoring engine 324, deployment engine 326, cloud management agent 327, or the like, that may perform actions further described below. In at least one of the various embodiments, one or more of the applications may be implemented as part of another application or engine. For example, a cloud management server may include one engine or application that acts as modeling engine 322, monitoring engine 324, or deployment engine 326.

Furthermore, in at least one of the various embodiments, modeling engine 322, monitoring engine 322, deployment engine 326, or the like, may be operative in a cloud-based computing environment, such as, cloud network 112. In at least one of the various embodiments, these applications, and others, may execute within virtual machines and/or virtual servers that may be managed in a cloud-based based computing environment. Also, in at least one of the various embodiments, modeling engine 322, monitoring engine 324, deployment engine 326, or the like, may be located in virtual servers running in a cloud-based computing environment rather than being tied to one or more specific physical network computers.

In at least one of the various embodiments, cloud instances operating in cloud environment or on cloud computing platforms may include more or less the same components as network computer 300. However, some or all, the components in a cloud instance may be virtualized and/or managed by a hypervisor, or the like. Likewise, cloud instances may include cloud management agents, such as, cloud management agent 327 that enable communication and coordination with one or more cloud management server computers.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be a standalone network computer, in other cases, HSM 360 may be arranged as a hardware card that may be installed in a network computer.

Additionally, in one or more embodiments (not shown in the figures), the network computer may include one or more embedded logic hardware devices instead of one or more CPUs, such as, an Application Specific Integrated Circuits (ASICs), Field Programmable Gate Arrays (FPGAs), Programmable Array Logics (PALs), or the like, or combination thereof. The embedded logic hardware devices may directly execute embedded logic to perform actions. Also, in one or more embodiments (not shown in the figures), the network computer may include one or more hardware microcontrollers instead of a CPU. In at least one embodiment, the one or more microcontrollers may directly execute their own embedded logic to perform actions and access their own internal memory and their own external Input and Output Interfaces (e.g., hardware pins and/or wireless transceivers) to perform actions, such as System On a Chip (SOC), or the like.

Illustrative Logical System Architecture

Figure 4:
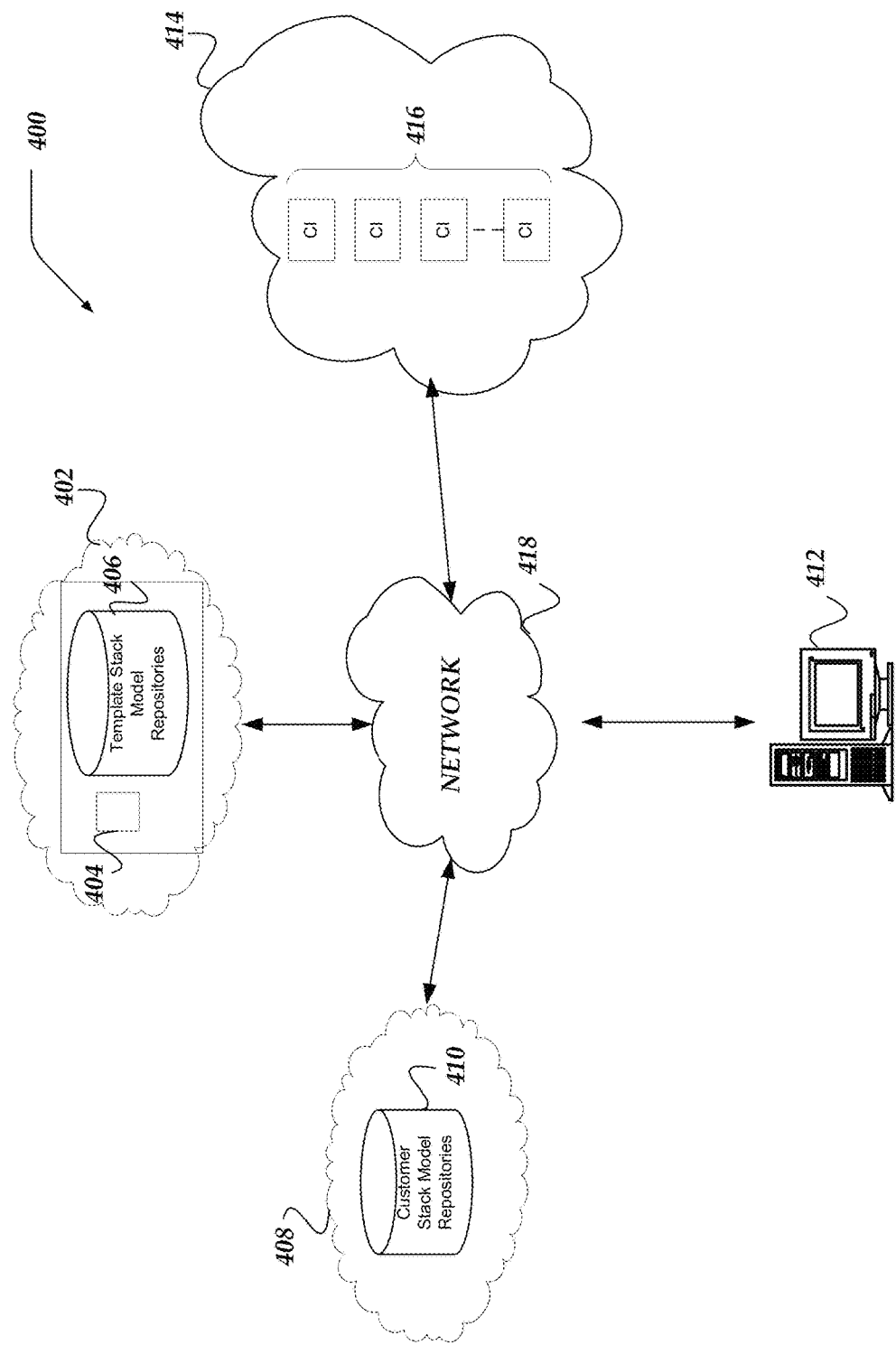
FIG. 4 illustrates a logical schematic of a cloud management system that is an accordance with at least one of the various embodiments.

FIG. 4 illustrates a logical schematic of cloud management system 400 that is an accordance with at least one of the various embodiments. In at least one of the various embodiments, system 400 comprises: cloud environment 402 that may be hosting cloud management server 404 that includes at least template stack repositories 406; cloud environment 408 that may be hosting customer stack repositories 410; development server 412; and cloud computing platform 414 that may include one or more cloud instances, such as, cloud instances 416. Further, in this examples, network 418 may be arranged to enable communication between the constituents of system 400.

In at least one of the various embodiments, network 418 may be considered similar to wireless network 108, wide area network 110, or the like, or combination thereof. Likewise, cloud environment 402, cloud environment 408, cloud computing platform 414 may be considered similar to cloud network 112. In some embodiments, cloud environment 402, cloud environment 408, cloud computing platform 414 may be part of the same cloud environment or one or more of them may be hosted in separate cloud environments. Further, in some embodiments, cloud management server 404 and customer stack repositories 410 may running on physical network computers rather than on virtualized machines in a cloud environment.

In at least one of the various embodiments, a user may configure a stack model for cloud infrastructure to provision or generate one or more cloud service stacks using development server 412. Accordingly, in at least one of the various embodiments, a user may register with cloud management server 404 and download one or more stack models.

In at least one of the various embodiments, the stack models provided by cloud management server 404 may be associated with a customer stack model repository stored on customer repositories 410. Accordingly, in some embodiments modifications made to the customer's stack model may be stored in customer stack model repositories 410. In some embodiments, cloud management server 404 may be arranged to host customer stack models directly rather than requiring a separate customer stack model repository.

In at least one of the various embodiments, development server 412 may include a cloud management client application that enables users (e.g., developers) to interact with cloud management server 404. For example, the cloud management client application may be arranged to enable a user to perform various tasks, such as: registering cloud service stacks and stack models with the cloud management server; downloading stack models from a stack model repository storage; uploading modified stack model to a stack model repository; initiate deployment of a cloud service stack to a cloud platforms; or the like.

In at least one of the various embodiments, if a stack model registered with cloud management server 404 may be selected for deployment to a cloud platform, cloud management server 404 may be arranged to launch a deployment engine to compile the stack model into configuration instructions for a cloud service stack tailored to the targeted cloud platform. In some embodiments, the deployment engine may compile a stack model into cloud platform specific instructions and configuration information for deploying the cloud service stack onto a particular cloud computing platform.

In at least one of the various embodiments, the deployment engine may be arranged to execute one or more control commands to configure the cloud platform as well as copy configuration information for the cloud service stack to the cloud platform itself.

In at least one of the various embodiments, the stack model may comprise hierarchal text information, that may include one or more text based scripts and/or programs. Accordingly, in at least one of the various embodiments, stack model repositories may provide content source control features, such as, version control, branching, merging, check-out, check-in, labeling, stack comparisons (e.g., diffs), revert changes, commit changes, or the like, or combination thereof.

In at least one of the various embodiments, stack models may be stored and/or represented using database tables, indexes, or the like. Further, stack models may be represents using graphs where the stack model entities are the nodes of the graph and the hierarchal relationships between the model entities may be represented as edges of the graph.

Further, in some embodiments, the stack models may include scripts that may be compiled into actions to be performed on a cloud platform. In some embodiments, such actions may include activating features, resources, or services provided by the particular cloud platform. In some embodiments, the deployment engine may generate cloud platform specific instructions from one or more platform independent scripts included in the stack model.

Also, in at least one of the various embodiments, stack models may include detailed configuration definitions for one or more cloud instances and/or applications that may be running as part of a deployed cloud service stack. For example, in some embodiments, stack models may define the set of allowed open ports for one or more virtual machines and/or cloud instances. Likewise, in some embodiments, the stack model may include application specific configuration information, such as, permission settings, file directories/locations, or the like. For example, in at least one of the various embodiments, a stack model for a service stack that includes one or more web server applications may define the configuration of the one or more web servers.

In at least one of the various embodiments, cloud management servers, such as, cloud management server 404 may be arranged to perform configuration audits of one or more deployed cloud service stacks. In at least one of the various embodiments, a modeling engine, such as, modeling engine 322 may be arranged to compare the configuration definitions in a stack model repository with the configuration of running cloud service stacks.

In at least one of the various embodiments, if differences are detected, the configuration engine may be arranged to log the differences, raise error, generate configured notifications, or the like, or combination thereof. In some embodiments, if differences between the running/deployed cloud service stacks and the stack models are detected, cloud management server 404 may launch the deployment engine to reconfigure the running tasks based on their corresponding stack model repository.

In at least one of the various embodiments, the deployment engine of a cloud management application may generate and provide cloud platform specific configuration packages based on the stack model. Further, in some embodiments, the cloud management application may launch a monitoring engine to scan resources deployed on the cloud platform to identify discrepancies in the deployed resources and configuration with respect to their corresponding stack models.

For example, in at least one of the various embodiments, a stack model may define firewall rules for a portion of the cloud environment used by the service stack (e.g., firewall rules for sub-nets in a virtual private cloud). In at least one of the various embodiments, a monitoring engine may obtain the firewall rules from the cloud platform and compare them to the firewall rules defined in the stack model. If discrepancies may be discovered, one or more relevant actions may be perform depending on policies defined for the stack. For example, in some embodiments, the cloud management server may launch the deployment engine to generate an updated configuration package to redeploy some or all of the original stack model to eliminate the discovered discrepancies and modify the affected resources such that they conform to the stack model.

In at least one of the various embodiments, a monitoring engine may be configured to periodically interrogate one or more resources of deployed cloud service stacks. In some embodiments, the timing for such interrogation may be flexed such that defined portions/resources of the cloud service stack are interrogated at different times. This may enable the cloud management server to moderate and/or balance any performance impacts that may be caused by the interrogation operations. Further, in some embodiments, some resources in a cloud service stack may be designated as sensitive while other resources may be designated as less-sensitive. Accordingly, in some embodiments, the frequency of interrogation may be higher for sensitive resources and lower for less-sensitive resources. In at least one of the various embodiments, the type and/or completeness of the interrogation may vary as well. In some embodiments, sensitive resources may be designate to be subject to more complete interrogations than less-sensitive resources.

In at least one of the various embodiments, the policies for monitoring resources and making sure they conform to the stack model may be established at various scopes, such as, cloud-application-stack wide, per resource, per resource group, per resource type, or the like, or combination thereof.

In at least one of the various embodiments, resources defined in a stack model may absent and/or different depending on the particular cloud platform provider where a cloud service stack may be deployed. Accordingly, in at least one of the various embodiments, the deployment engine may be arranged to generate provider specific work arounds that may provide the same functionality as the missing resources. In some embodiments, there may be a one-to-one for some resources on some cloud platforms while for other cloud platforms one or more different resources and/or configurations may be brought to bear to perform the required functions. In some embodiments, the resource defined in the stack model may be unavailable on a particular cloud platform. If such a circumstance is entered during the deployment of a stack, the deployment engine may raise an error and abort the deployment operations.

In at least one of the various embodiments, the stack model may be arranged to include alternative configurations to handle cases where resources or configurations may be incompatible with a particular platform. For example, during generating of the cloud platform configuration information the deployment engine may determine that the target cloud platform does not support a resource or resource feature defined in the stack model, if the stack model includes an alternative (e.g., fallback) configuration definition that information may be used to generate the configuration package for the cloud platform.

In at least one of the various embodiments, if changes are made to the stack model for a cloud service stack, the deployment engine may be arranged to automatically apply the relevant changes to cloud service stack. In some case, applying a change may require one or more cloud instances to be shutdown, de-provisioned, rebooted, or the like, or combination thereof. Accordingly, in some embodiments, pushing out updated configuration packages based on changes made to stack models may be scheduled to occur at certain times.

Figure 5:
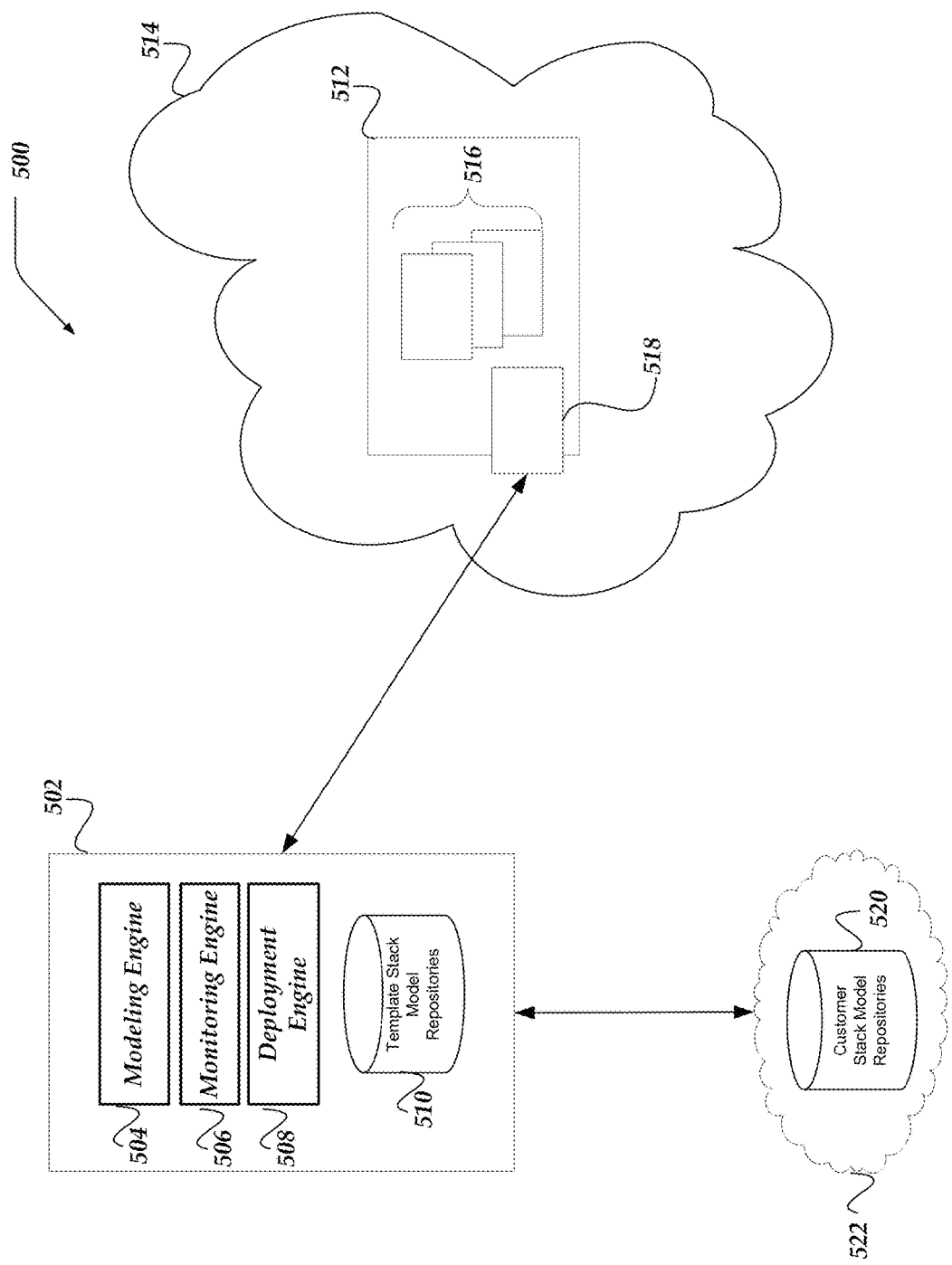
FIG. 5 illustrates a logical schematic of a cloud management system that is an accordance with at least one of the various embodiments.

FIG. 5 illustrates a logical schematic of cloud management system 500 that is an accordance with at least one of the various embodiments. In at least one of the various embodiments, cloud management server 502 may include modeling engine 504, monitoring engine 506, deployment engine 508, template stack repositories, or the like.

In at least one of the various embodiments, cloud instance 512 may be one of many cloud instances deployed and running on cloud platform 514. In some embodiments, cloud instance 512 may include one or more processes, such as, processes 516 that may be performing various jobs, services, or the like, on a given cloud instance. In at least one of the various embodiments, cloud instance 512 may be considered to be part of a cloud service stack that may be configured and deployed based on a stack model.

In at least one of the various embodiments, cloud instances may include arranged to cloud management agents, such as, cloud management agent 518. In some embodiments, cloud management agent 518 may be arranged to be communicatively coupled with one or more cloud management servers, such as, cloud management server 502.

Also, in at least one of the various embodiments, system 500 may include customer stack repositories, such as, customer stack repositories 520 that may be hosted in a cloud environment, such as, cloud environment 522.

In at least one of the various embodiments, if cloud management server 502 deploys a cloud service stack to a cloud platform, it may access the customer stack repositories, such as, customer stack repositories 520 to obtain the stack model for a particular cloud service stack. In at least one of the various embodiments, deployment engine 508 may process the stack model to deploy the cloud service stack to a cloud platform.

In at least one of the various embodiments, cloud management agent 518 may be arranged to enable internal monitoring and/or auditing of the cloud instances that may be part of a cloud service stack. Accordingly, in at least one of the various embodiments, cloud management server 502 may be arranged to launch monitoring engine 506 so monitoring engine 506 perform various monitoring and auditing operations.

In at least one of the various embodiments, monitoring engine 506 may communicate various commands to cloud management agent 518 to initiate various monitoring functions. Likewise, cloud management agent 518 may be arranged to communicate results of monitoring to cloud management server 502.

In at least one of the various embodiments, cloud management agent 518 may be arranged to include one or more triggering conditions that may initiate an event/communication to monitoring engine 506 if the certain conditions are met. For example, in some embodiments, cloud management agent 518 may be arranged to generate a notification if the number of processes exceeded a defined threshold.

Also, in some embodiments, cloud management agent 518 may be arranged perform various system level analysis onboard its hosted cloud instance. In at least one of the various embodiments, cloud management agent 518 may be arranged to scan for open ports, installed packages, running processes, scan log files, or the like, or combination thereof. The scan results may be compared stack model information to determine if the cloud instance is not conformed to the stack model.

In at least one of the various embodiments, if the cloud management agent reports that a cloud instance is operating out of bounds of its corresponding stack model, the cloud management server may take appropriate action, including, de-provisioning the non-conforming cloud instance.

In at least one of the various embodiments, cloud management agent 518 may be arranged to report performance utilization information of individual cloud instances to cloud management server 502. In some embodiments, cloud management server 502 may be arranged to compare the amount and type of cloud platform resources that may be purchased/reserved to the actual usage of a cloud application task. Accordingly, in some embodiments, cloud management server 502 may be arranged to recommend compute and storage allocations that may be more cost effective for one or more cloud application tasks.

In at least one of the various embodiments, cloud management server 502 may be arranged to collect performance/utilization metrics for cloud service stacks that may be provided by the cloud platforms. Accordingly, in at least one of the various embodiments, the information provided by the cloud platform may be used to identify cost-saving optimizations that may be available. For example, in at least one of the various embodiments, performance metrics may indicate that one or more cloud service stacks may safely use less expensive cloud instances, storage options, or network options.

In at least one of the various embodiments, cloud manager server 502 may identify cloud platform resources that are being paid for, but may not be used. For example, in some cases, a cloud platform may allocate various real resources in different geographical regions to ensure responsiveness and availability to users that may be in different parts of the world. Accordingly, in some cases, a cloud service stack may be configured to have cloud instances (e.g., resources) spread evenly across different geographical regions of a cloud platform. However, in some cases, the actual usage reports may indicate that certain regions need more resources than others or some regions do not need as many resources. In this case, in some embodiments, the cloud manager server may identify the over-utilization of one area and the underutilization of the others—recommending a re-allocation of resources to reflect actual usage rather than simply evenly spreading resources across the different geographic regions.

In at least one of the various embodiments, cloud management server may be configured to automatically perform the cost savings optimization. In such cases, the cloud management server may update the stack model and re-deploy the cloud service stack to a cloud platform.

Figure 6:
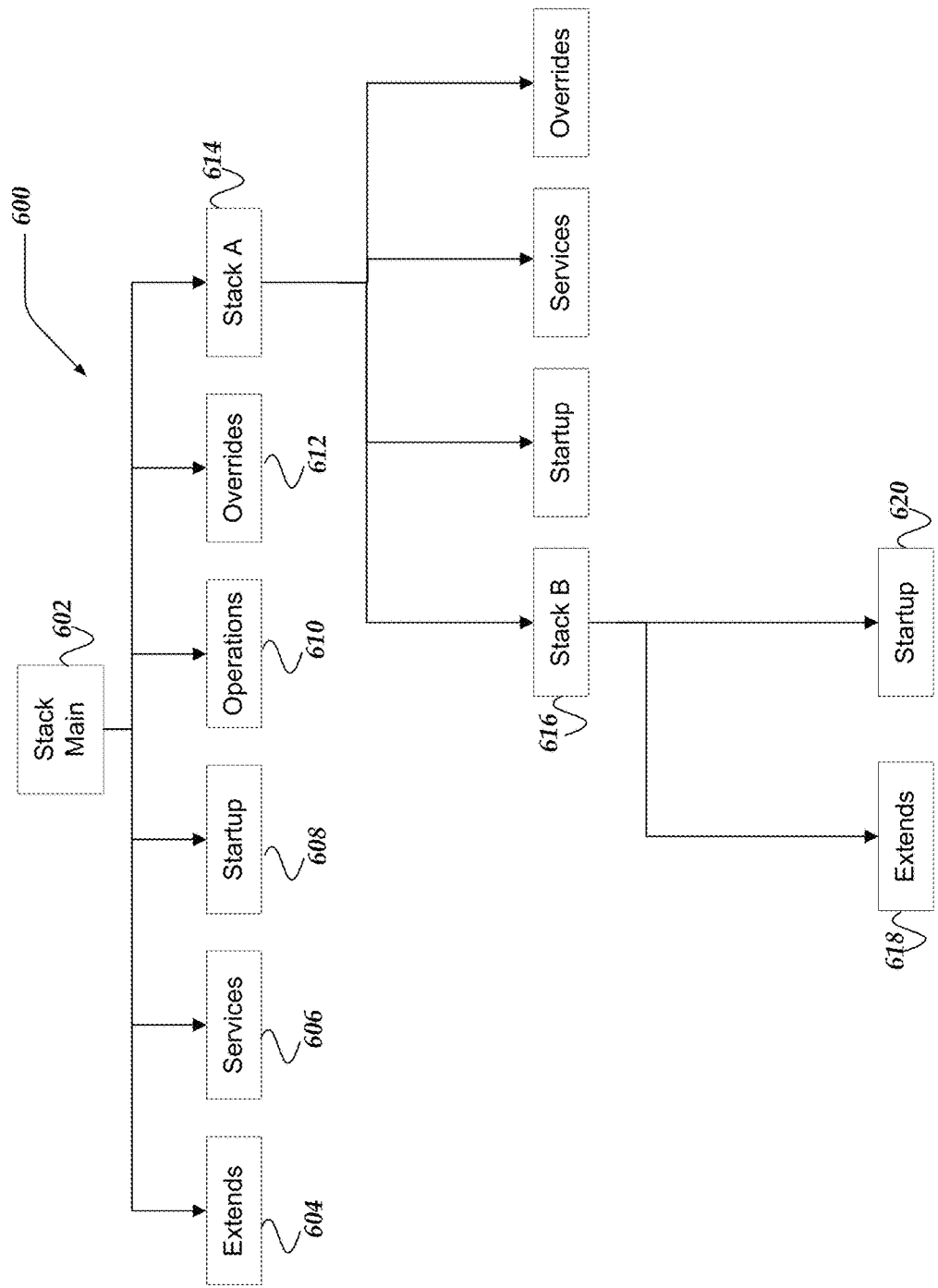
FIG. 6 illustrates a logical schematic of a stack model that is an accordance with at least one of the various embodiments.

FIG. 6 illustrates a logical schematic of stack model 600 that is an accordance with at least one of the various embodiments. In at least one of the various embodiments, a modeling engine, such as, modeling engine 322, may be arranged to provide stack models that may represent cloud service stacks for customers. In at least one of the various embodiments, stack models may be cloud platform independent representations of the cloud service stacks. In at least one of the various embodiments, a deployment engine, such as deployment engine 326 may be arranged traverse a stack model to generate a configuration package that includes provisioning/configuration information for cloud service stack. As discussed above, the deployment engine may generate a configuration package that conforms to the requirements of a particular cloud platform.

In at least one of the various embodiments, changes made to a stack model may be automatically compiled into an updated configuration package that may be pushed out to the target platform.

In at least one of the various embodiments, stack models, such as, stack model 600 may include a variety of entities. In some embodiments, some entities may be optional or otherwise not included in all stack models.

In at least one of the various embodiments, stack model 600 may include a top level entity, such as, main 602, next level entities, such as, extends 604, services 606, startup 608, operations 610, overrides 612, or the like. In some embodiments, stack models may include other stack models. In this example, the stack model for Stack A 614 may be embedded in stack model 600. Accordingly, stack model 600 may be considered a main stack model with respect to Stack A 614.

In at least one of the various embodiments, embedded stack models, such as, Stack A 614 may include their own entities similar to stack model 600. However, in at least one of the various embodiments, the number and/or type of entities are not required to be the same as the main stack model.

Further, in at least one of the various embodiments, embedded stack models, such as, Stack A 614 may also include embedded stack models, such as, Stack B 616. In this example, Stack B 616 include two entities, extends 618 and startup 620.

In at least one of the various embodiments, the structure of a stack model represents a relationship among major components of a cloud service stack. In at least one of the various embodiments, entities may represent resources that may be deployed on a cloud platform. Also, in at least one of the various embodiments, entities may represent operations/actions that may be performed on cloud platform, either for configuration purposes, or performing tasks associated with the cloud service stack.

In at least one of the various embodiments, the root entity for a stack model, such as, main 602, Stack A 614, or Stack B 616, may include configuration information that may be referenced by other entities in the model.

In at least one of the various embodiments, some may be arranged to have special meaning. For example, in some embodiments, extends entities represent stack models that the current may extend. Accordingly, in at least one of the various embodiments, an extends entity, such as, extends 604 may reference another stack model. If during the generation of a configuration package for a cloud service stack the deployment engine encounters an extends entity, the stack model referenced by the extends entity may be processed before processing the rest of the entities in the stack model.

In at least one of the various embodiments, a services entity, such as, services 606 may define the resources and services that should be made available on the cloud service stack. Accordingly, the deployment engine may be arranged generate a configuration package that includes resource definitions and configurations that will provision a cloud service stack on the targeted cloud platform.

In at least one of the various embodiments, a startup entity, such as, startup entity 608, may define startup actions that may be executed if the cloud service stack is launched on a cloud platform. For example, in some embodiments, the startup entity may include one or more scripts that may be launched on some or all of the cloud instances that may included in the cloud service stack.

In at least one of the various embodiments, an operations entity, such as, operations entity 610, may define resources and/or operations that may be exposed by a cloud service stack to users/administrators that will be operating the cloud service stack. It may include definitions for interfacing with control panels, dashboards, command-line interfaces, or the like, that may be available provided by the cloud platform.

In at least one of the various embodiments, an overrides entity, such as, overrides entity 612 may be arranged to define override information that may be used to override some actions in embedded stack models or extended (from) stack models. In at least one of the various embodiments, overrides may be additive—adding additional configuration or resources to an embedded stack model. Likewise, in some embodiments, override entities may be used by the deployment engine to replace information and/or entities in an embedded stack model.

In this example, Stack B 616, includes an extends entity, extends 618 and a startup entity, startup 620. Accordingly, in this example Stack B 616, may be the same as the extended stack model plus particular startup operations that maybe encapsulated in startup entity 620.

In at least one of the various embodiments, to deploy a cloud service stack, a deployment engine may traverse the corresponding stack model and generate the configuration package that includes that information to provision and/or install the cloud service stack on the cloud platform. In some embodiments, the deployment engine may be configured to be periodically launched and update the configuration package based on changes in the stack model, if any, and push the updated configuration package to the targeted cloud platform.

In at least one of the various embodiments, if changes are made to stack models referenced by an extends entity, the deployment engine may automatically pick up those changes and incorporate some or all of them in the configuration package for the cloud service stack.

Figure 7:
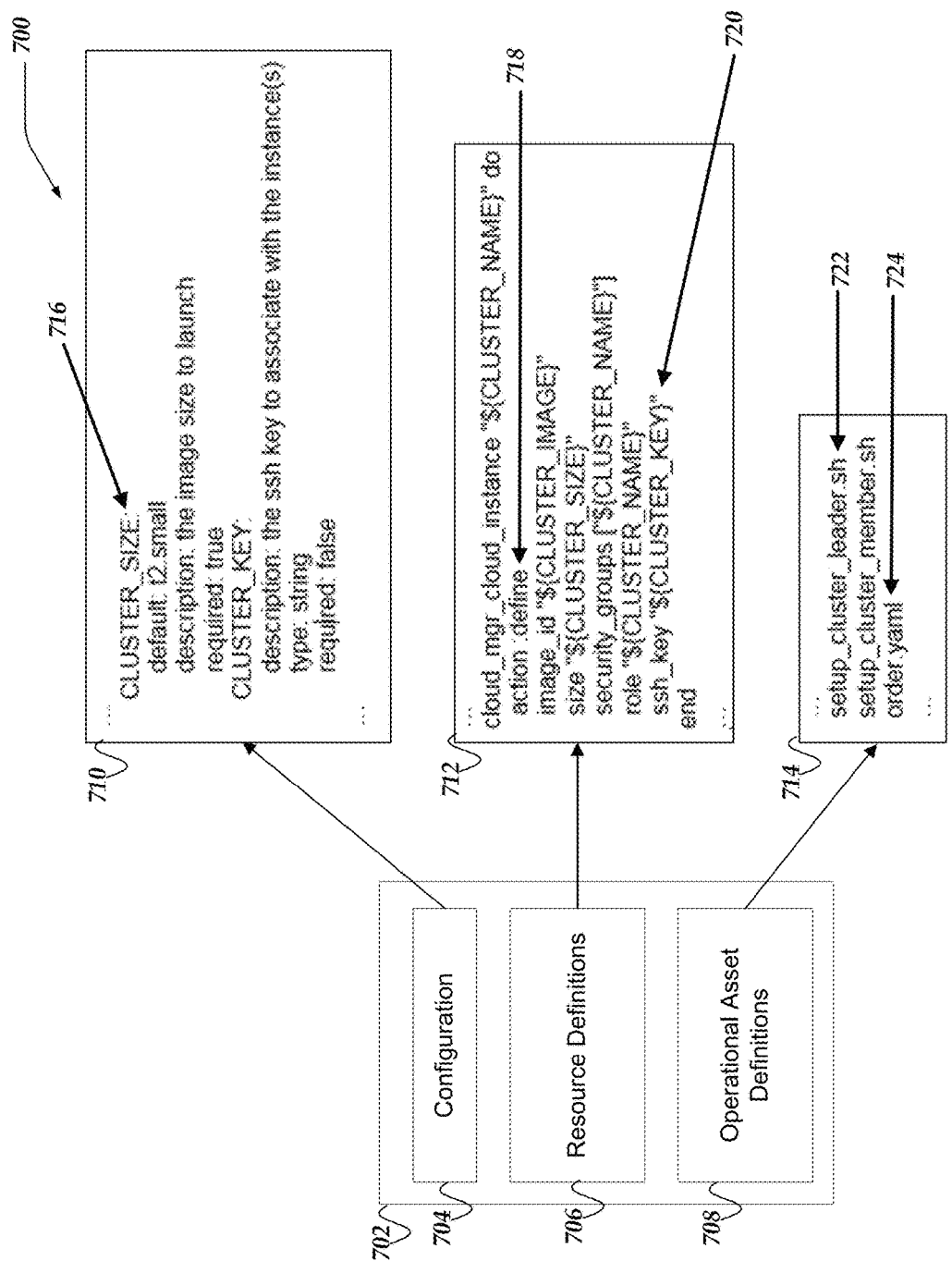
FIG. 7 illustrates a logical schematic of a portion of a stack model that is an accordance with at least one of the various embodiments.

FIG. 7 illustrates a logical schematic of a portion of stack model 700 that is an accordance with at least one of the various embodiments. In at least one of the various embodiments, stack model 700 may include one or more entities, in this example entity 702 is described as an example of how stack model entities may be arranged. In at least one of the various embodiments, entity 702 may comprise one or more sub-components. In this example, entity 702 includes configuration component 704, resource definitions 706 and operational asset definitions 708.

In at least one of the various embodiments, configuration component 704 may provide meta-data that the deployment engine may use when compiling stack models into cloud platform configuration information. In at least one of the various embodiments, resource definitions 706 include definitions for one or more resources that may deployed or configured on the cloud platform. And, in this example, operation asset definitions 708 may include one or more assets that may be duplicated and provided to the cloud service stack. In some embodiments, operational assets may include scripts or programs that may be executed during or after the cloud service stack is deployed to the target platform.

In at least one of the various embodiments, different operational assets may be deployed depending of the target cloud platform. Accordingly, in some embodiments, configuration 704 may be arranged to define which assets are used for particular cloud platforms. Likewise, in some embodiments, configuration 704 may be arranged to describe the order in which the assets may be applied or executed.

In at least one of the various embodiments, resource definitions 706 include cloud platform independent descriptions of the resources to be provisioned or configured on the target cloud platform. For example, in some embodiments, resource definitions 706 for a particular stack model may define one or more network topologies for the cloud applications. Also, in some embodiments, resource definitions 706 may include, the type of cloud instances to use, min/max of the number cloud instances, security policies, geographic regions where to install cloud instances, routing tables, network address translation instances, or the like.

Also, in at least one of the various embodiments, resources 706 may define configuration information for each defined resource. In some embodiments, a deployment engine may use information defined in configuration 704 to configuration resources defined in resources 706. For example, an entity that defines multiple cloud instances may also define network addresses, ingress ports, egress ports, tags, labels, or the like, for each of the cloud instances.

In at least one of the various embodiments, as mentioned above, some entities in a stack model may be assigned special purposes and may include all three types of components. For example, in some cases, there may only be one or two components, such as, startup entities that may often just include configuration and operational asset components.

In at least one of the various embodiments, stack model entities may be arranged to represent configuration definitions, resources, or assets, using a variety of methods. In some embodiments, one or more data structures may be used to provide a common (e.g., not tied to a particular cloud platform) representation configurations, resources, assets, or the like. In at least one of the various embodiments, a deployment engine may be arranged to traverse the stack model (and its entities) and generate a configuration package that includes instructions suitable for deploying the cloud service stack to a specific target cloud platform.

In this example, block 710 represents a portion of configuration information that may be included as part of a configuration component of a stack model entity. Also, block 712 represent a portion of a resource sub-component, and block 714 represents a portion of an operation asset component.

In at least one of the various embodiments, configuration information, may include one or more values that may be defined for use elsewhere in the stack model. In this example, block 710, defines values for CLUSTER_SIZE 716 and CLUSTER_KEY which may be used by other components of model entity 702, or other stack model entities. As shown, each configuration value may have various properties that may be used by the deployment engine for interpreting how to apply the given configuration value. For example, in this case, CLUSTER_SIZE 716 is defined as being required. Accordingly, if it has a blank or undefined value the deployment engine may abort the deployment process. (Note, here a default value is defined so the required condition should be met automatically.)

In at least one of the various embodiments, resource definitions define the resources that are going to part of the cloud service stack. In block 712, cloud instances are being defined. In this example, action 718 indicate that the deployment engine should generate a configuration package that includes cloud platform instruction that will create a cloud instance on the cloud platform as part of the cloud service stack. Further, additional properties for the cloud instance may also be defined. In some cases, such as, for ssh_key 720 (and others shown here but not annotated) the resource definition may reference configuration information defined elsewhere, such as, in block 710.

In at least one of the various embodiments, block 714, shows a portion of the operational assets that may be included in a stack model entity. In this example, there are two scripts and one configuration file that may be deployed as part of the cloud service stack. In some embodiments, scripts, such as, script 722 may execute on the cloud instances after they are started. In some embodiments, stack models may include one or more model entities that may be specifically designed for providing scripts for execution, such as startup model entities. In this example, block 714 includes local configuration information that may define the order the scripts should execute. Thus, in some embodiments, during deployment, the configuration package provided by the deployment engine may ensure that the operational assets are installed in the correct place so they may execute as needed.

In at least one of the various embodiments, resource definitions in a stack model entity may be arranged to include actions to traverse a stack model to find particular model entities that may be modified and/or configured. For example, a resource definition in one stack model or stack model entity may include one or more search expressions that may be used to find matching entities in the stack model. For example, a stack model may be arranged to add security features to matched cloud instances. Accordingly, in this example, a search expression may be used find a collection of cloud instance resources. Then, continuing with this example, the matched cloud instances may have the additional security features added to them. In some embodiments, search expressions may employ various methods or computer languages, such as, pattern matching (e.g., regular expressions), value testing, Boolean algebra, structured query language, or the like, or combination thereof.

In at least one of the various embodiments, the resource definitions may be defined to search within the cloud platform configuration instructions. Accordingly, in at least one of the various embodiments, the deployment engine may encounter a stack model entity that may require the deployment engine to lookup into previously generated cloud platform configuration instructions to identity configuration information that may be modified.

Thus, in at least one of the various embodiments, a stack model that the deployment engine processes later may cause the deployment engine to modify configuration instructions produced from other stack models. For example, referring to FIG. 6. In at least one of the various embodiments, the deployment engine will process stack models, Stack Main 602 and Stack A 614 before it process stack model Stack B 616. Accordingly, in some embodiments, resource definitions in Stack B 616 may be defined to look back into configuration instructions generated from Stack Main 602 and Stack A 614 and make modifications. For example, in some embodiments, Stack B may be arranged to add SSL keys to some cloud instance resources defined for the cloud service stack. In this example, the particular cloud instances may be identified using a search expression, similar to the search expression described above.

In at least one of the various embodiments, while for brevity and clarity data structure examples for the model entity components, one of ordinary skill in the art will appreciate the stack models may include many more and different types of resources than shown or discussed herein. Likewise, in some embodiments, various well-known data structures may be used to represent the stack model and stack model entities, such as, graphs, lists, arrays, hashes, custom data structures, or the like, or combination thereof. Also, one of ordinary skill in the will appreciate that such data structures may be stored and/or represented using various well-known methods, such as, XML, Javascript Object Notation (JSON), text files, file systems, database tables, or the like, or combination thereof. Further, in some embodiments, resources may be defined using a combination of data structures and instructions with the instructions may be provided using various computer programming languages, such as, Python, Perl, C, C++, C#. Java, Javascript, Haskell, Clojure, Ruby, Scala, custom languages, or the like, or combination thereof.

Figure 8:
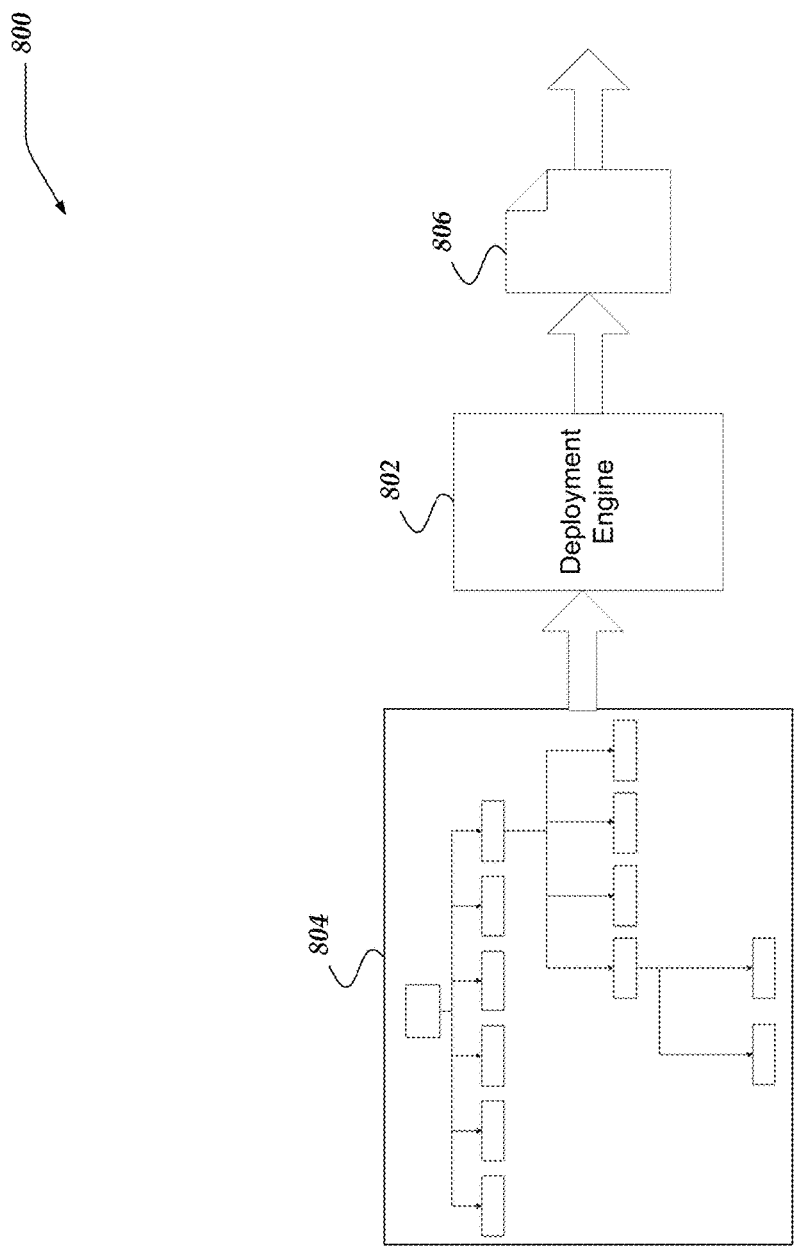
FIG. 8 illustrates a logical schematic of a process for deploying and monitoring multi-platform cloud-based infrastructures that is an accordance with at least one of the various embodiments.

FIG. 8 illustrates a logical schematic of process 800 for deploying and monitoring multi-platform cloud-based infrastructures that is an accordance with at least one of the various embodiments. In at least one of the various embodiments, a deployment engine, such as, deployment engine 802 may be provided a stack model, such as, stack model 804. Accordingly, deployment engine 802 may traverse stack model 804 to generate configuration package 806 that may be used to deploy, provision, or configure a target cloud platform to provide a cloud service stack that corresponds to stack model 804.

In at least one of the various embodiments, a deployment engine may be arranged to traverse a stack model and generate configuration information corresponding to each model entity that is encountered. In at least one of the various embodiments, if the deployment engine discovers stack models and/or stack model entities that include errors the deployment engine may abort the process. In some embodiments, the deployment engine may encounter stack models or stack model entities that are inconsistent with the target cloud platform. Accordingly, if alternative options are not provided by the stack model, the deployment engine may abort the process.

In at least one of the various embodiments, deployment engine 802 may be considered to be an instance of deployment engine 326 on network computer 300.

Generalized Operations

FIGS. 9-17 represent the generalized operation for deploying and monitoring multi-platform cloud-based infrastructures in accordance with at least one of the various embodiments. In at least one of the various embodiments, processes 900, 800, 900, 1000, 1100, 1200, 1300, 1400, 1500, 1600, and 1700 described in conjunction with FIGS. 9-17 may be implemented by and/or executed by one or more processors on a single network computer, such as network computer 300 of FIG. 3. In other embodiments, these processes, or portions thereof, may be implemented by and/or executed on a plurality of network computers, such as network computer 300 of FIG. 3. In yet other embodiments, these processes, or portions thereof, may be implemented by and/or executed on one or more virtualized computers, such as, cloud instances 114. However, embodiments are not so limited and various combinations of network computers, client computers, cloud instances, or the like may be utilized. Further, in at least one of the various embodiments, the processes described in conjunction with FIGS. 9-17 may be used for deploying and monitoring multi-platform cloud-based infrastructures in accordance with at least one of the various embodiments and/or architectures such as those described in conjunction with FIGS. 4-8.

Further, in at least one of the various embodiments, some or all of the action performed by processes 900, 800, 900, 1000, 1100, 1200, 1300, 1400, 1500, 1600, and 1700 may be executed in part by modeling engine 322, monitoring engine 324, deployment engine 326, or the like, running on one or more processors of one or more network computers.

Figure 9:
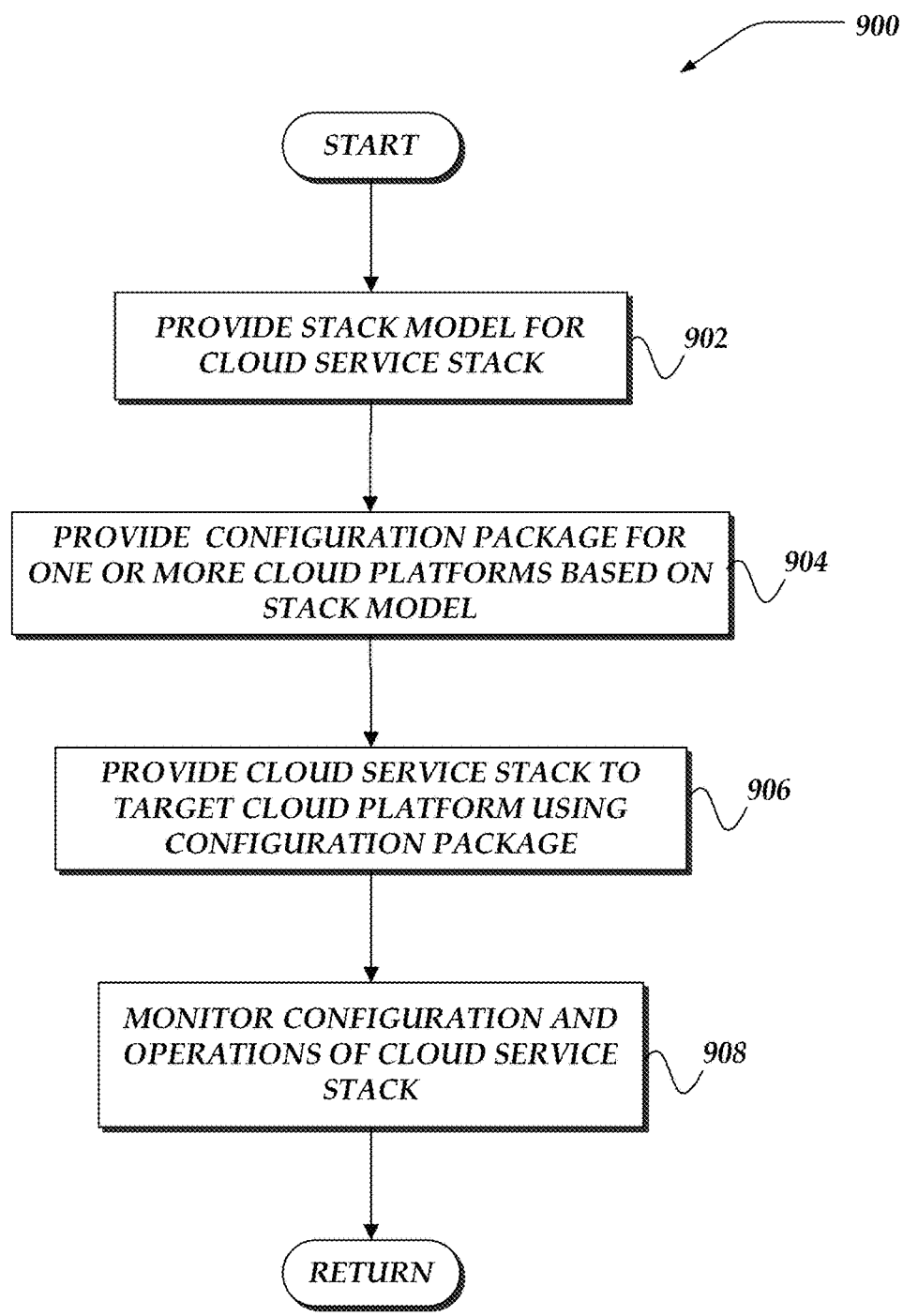
FIG. 9 illustrates an overview flowchart for a process for deploying and monitoring multi-platform cloud-based infrastructures in accordance with at least one of the various embodiments.

FIG. 9 illustrates an overview flowchart for process 900 for deploying and monitoring multi-platform cloud-based infrastructures in accordance with at least one of the various embodiments. After a start block, at block 902, in at least one of the various embodiments, a stack model that represents a cloud service stack may be provided. In at least one of the various embodiments, a modeling engine, such as, modeling engine 322, may be arranged to be employed to generate and/or provided one or more stack models. In at least one of the various embodiments, as discussed above, stack model may be platform independent representation of a cloud service stack.

At block 904, in at least one of the various embodiments, a configuration package that includes configuration information for a cloud service stack may be provided for one or more cloud platforms. In at least one of the various embodiments, the configuration package may be generated by a deployment engine, such as, deployment engine 326 that may be arranged to traverse the one or more stack models to provide a configuration package that is particularized for the one or more cloud platform.

At block 906, in at least one of the various embodiments, one or more cloud service stacks may be provided to one or more cloud platform using the one or more configuration packages. In at least one of the various embodiments, the deployment engine may be executed to generate a configuration package that may be suitable for the cloud service stack to be realized/created on the one or more target cloud platforms.

In at least one of the various embodiments, the configuration package may include instructions for provisioning resources, configuring provisioned resources, launching provisioned resources, or the like. In some embodiments, a configuration package may include scripts, programs, or the like, that may be executed by certain provisioned resources, such as, virtual machines and/or cloud instances.

At block 908, in at least one of the various embodiments, the current configuration and operation of the cloud service stack may be monitored. In some embodiments, a monitoring engine, such as, monitoring engine 324 may be arranged to monitor one or more performance metrics of the cloud service stack. In some embodiments, the monitoring engine may receive metrics that may be collected by one or more cloud management agents that may be executing on one or more cloud instances and/or virtual machines.

In at least one of the various embodiments, the monitoring engine may be executed to collect information and/or metrics. In at least one of the various embodiments, the monitoring engine may be arranged to execute one or more rule based policies defined by the stack model. In some embodiments, policy rules may describe various actions that may be performed depending on the values of the metrics. In some embodiments, metrics may be measurements or counts of events, such as, CPU utilization, memory utilization, I/O utilization, storage utilization, or the like. In at least one of the various embodiments, metrics may be status information or reports. For example, in some embodiments, metric information may include the set of TCP/IP ports/connections that are open, the set of processes that are running, network information (e.g., route tables, firewall rules, network address, or the like), user lists, or the like, or combination thereof.

In at least one of the various embodiments, if the metrics exceed one or more defined threshold and/or meet one or more conditions the monitoring engine may signal that the cloud service stack should be re-deployed. In some embodiments, the deployment engine may then automatically generate an updated configuration package based on its corresponding stack model that may be used to re-deploy the cloud service stack. In at least one of the various embodiments, the deployment engine may be arranged to wait until a user intervenes and initiates the re-deployment of the cloud service stack.

Next, in at least one of the various embodiments, control may be returned to a calling process. In at least one of the various embodiments, a cloud management server that includes a modeling engine, deployment engine, and configuration engine may be arranged to continuously monitor the cloud service stack and the stack model. In some embodiments, changes in the stack model may trigger re-deployments. Also, signals from the monitoring engine may trigger re-deployments. In at least one of the various embodiments, each re-deployment whether automatic or manual, may use a configuration package that includes configuration information generated based on the stack model (and any included or referenced stack models) that may be associated with the cloud service stack that is being monitored.

Figure 10:
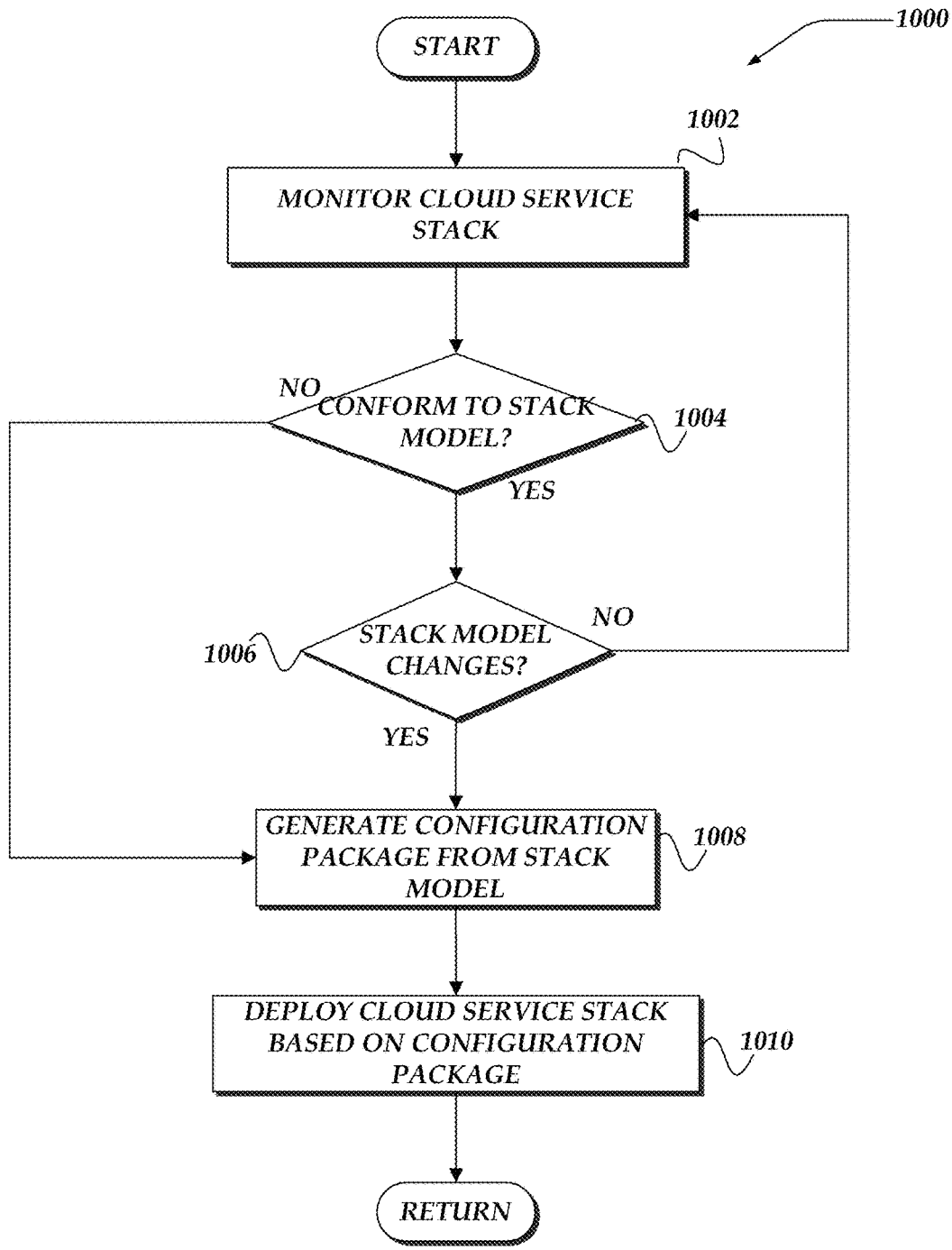
FIG. 10 illustrates an overview flowchart for a process for monitoring multi-platform cloud-based infrastructures in accordance with at least one of the various embodiments.

FIG. 10 illustrates an overview flowchart for process 1000 for monitoring multi-platform cloud-based infrastructures in accordance with at least one of the various embodiments. After a start block, at block 1002, in at least one of the various embodiments, a monitoring engine, such as, monitoring engine 324 may be executed to monitor various metrics that may be associated with the cloud service stack.

At decision block 1004, in at least one of the various embodiments, if the cloud service stack conforms to its corresponding stack model, control may flow to decision block 1006; otherwise control may flow to block 1008. In at least one of the various embodiments, the stack model may include one or more policies that define whether certain configuration are mandatory or optional. Also, in at least one of the various embodiments, stack models may define various thresholds or ranges of values that if exceeded may trigger a re-deploy. For example, a stack model may define range for the number of web servers that may be deployed in a cloud service stack, such as, 5-10, if the number of web servers falls outside of that defined range, it may trigger a re-deploy. Likewise; for example, a stack model may define that there is only one user allowed to have elevated privileges, accordingly, if the monitoring engine detects more than one user with elevated privileges, a re-deploy may be triggered. Further, for example, if a stack model defines a fixed set of network ports (e.g., TCP/IP ports) to be allowed through a firewall, if the monitoring engine discovers the firewall is open for additional ports it may trigger a re-deploy of the cloud service stack.

At decision block 1006, in at least one of the various embodiments, if there are changes that have been made the stack model that is associated with the cloud application, control may flow block 1008; otherwise, control may loop back bock 1002. In at least one of the various embodiments, developers/administrators may make legitimate modifications to the stack model. Accordingly, the monitoring engine may detect that if a deployed cloud service stack does not match the current version of its corresponding stack model.

At block 1008, in at least one of the various embodiments, since there are discrepancies between the stack model and the cloud service stack, a new or updated configuration package that includes configuration information for the target cloud platforms may be generated. In at least one of the various embodiments, a deployment engine may traverse the stack model corresponding with the cloud service stack to generate the configuration package for provisioning/managing the cloud service stack on the targeted cloud platforms.

At block 1010, in at least one of the various embodiments, a deployment engine may deploy the cloud service stack using the configuration package that was generated from the stack model. In at least one of the various embodiments, the deployment engine may provide the configuration package to the cloud platforms and initiate the deployment/provisional of the cloud service stack. Next, control may be returned to a calling process.

Figure 11:
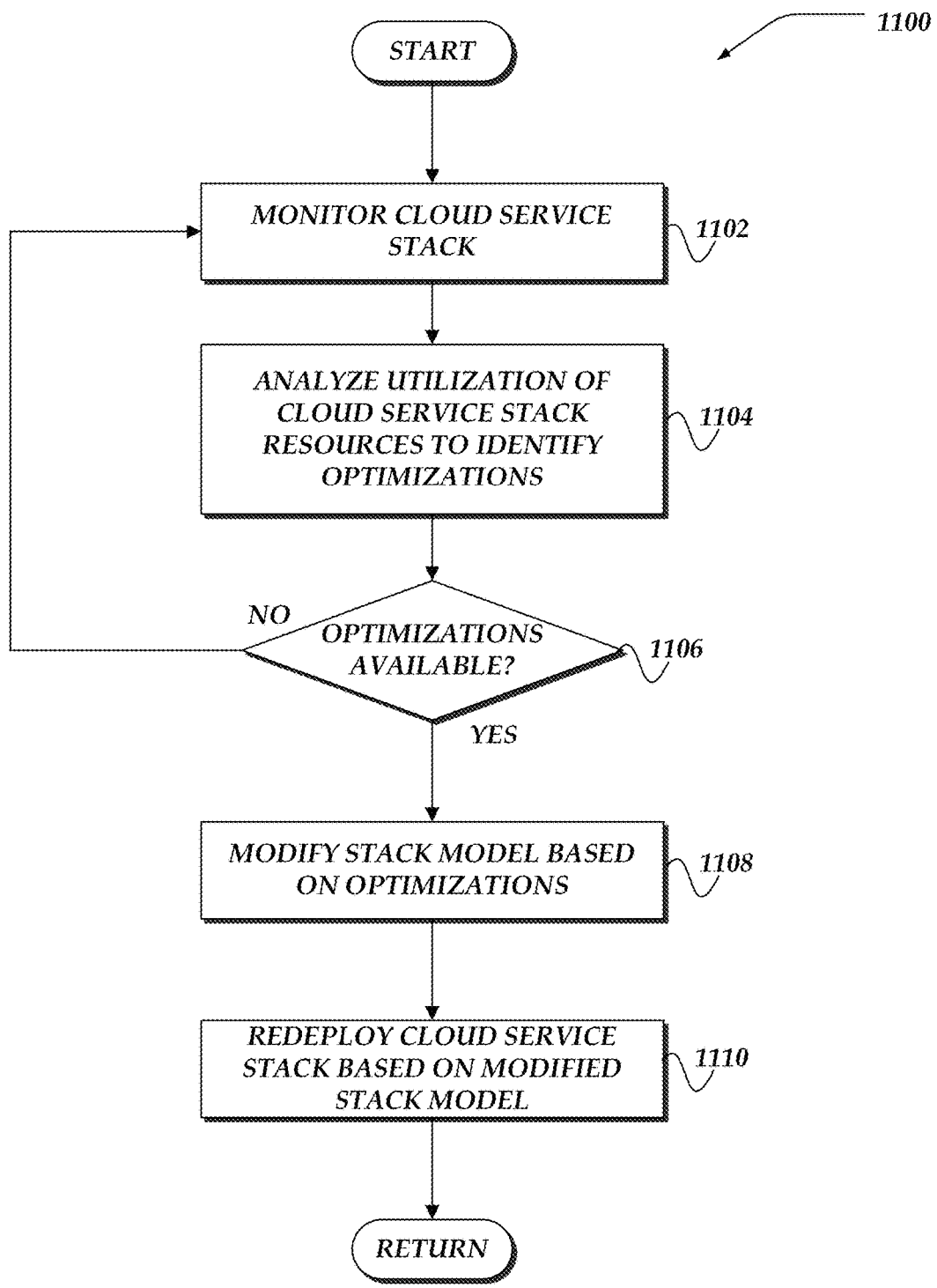
FIG. 11 illustrates an overview flowchart for a process for monitoring multi-platform cloud-based infrastructures in accordance with at least one of the various embodiments.

FIG. 11 illustrates an overview flowchart for process 1100 for monitoring multi-platform cloud-based infrastructures in accordance with at least one of the various embodiments. After a start block, at block 1102, in at least one of the various embodiments, a monitoring engine may be launched to monitor one or more cloud service stacks. In at least one of the various embodiments, the monitoring engine may collect metrics from the cloud platform, provisioned resources, cloud management agents, or the like, or combination thereof. Further, in some embodiments, the monitoring engine may be arranged to monitor published pricing information for various resources and/or configurations offered by the cloud platforms.

At block 1104, in at least one of the various embodiments, the monitoring engine may be arranged to analyze the utilization metrics for resources associated with the cloud service stack to identify potential optimizations. In at least one of the various embodiments, the monitoring engine may be arranged to compare the performance capacity of resources to the actual utilization of resources.

In at least one of the various embodiments, the monitoring engine may employ various configurable heuristics to determine if one or more resources of the cloud service stack may be over utilized or underutilized. Also, in at least one of the various embodiments, the monitoring engine may be arranged to determine if the current costs and/or projected costs of the resources used by the cloud service stack may exceed a defined maximum value.

In at least one of the various embodiments, the monitoring engine may be arranged to generate time bucketed metrics information (time-series metrics) that may be used for determining peak time-of-use for the one or more resources of the cloud service stack.

At decision block 1106, in at least one of the various embodiments, if one or more optimizations are available, control may flow to block 1108; otherwise, control may loop to block 1102. In at least one of the various embodiments, the monitoring engine may be arranged to execute one or more rule based monitoring policies that may try to identify the one or more optimizations. In at least one of the various embodiments, the policies may include programmatic/configurable elements that enable various conditions to be tested against the collected metrics and the known/provided costs associated with the resources.

In at least one of the various embodiments, the policies may define a rolling/sliding window of time, such as, one month, three months, one year, or the like, for analyzing metrics trends and/or pricing trends. Accordingly, in at least one of the various embodiments, as the behavior/utilization of the cloud service stack changes over time, the monitoring engine may continuously identify potential optimizations.

At block 1108, in at least one of the various embodiments, the monitoring engine may provide one or more optimizations that the modeling engine may apply to the stack model. In at least one of the various embodiments, policies employed by the modeling engine may define which optimizations and/or class of the optimizations may be automatically application to the stack model. Other optimizations may be configured to require manual intervention and/or approval before they are applied to the stack model.

At block 1110, in at least one of the various embodiments, the cloud service stack may be re-deployed to the cloud platform after the stack model is modified by the modeling engine. In at least one of the various embodiments, polices of the deployment engine, modeling engine, or monitoring engine, may defer or delay the deployment of the updated cloud service stack. In some embodiments, such policies may defer the deployment until a user provides authorization to proceed. Next, in at least one of the various embodiments, control may be returned to a calling process.

Figure 12:
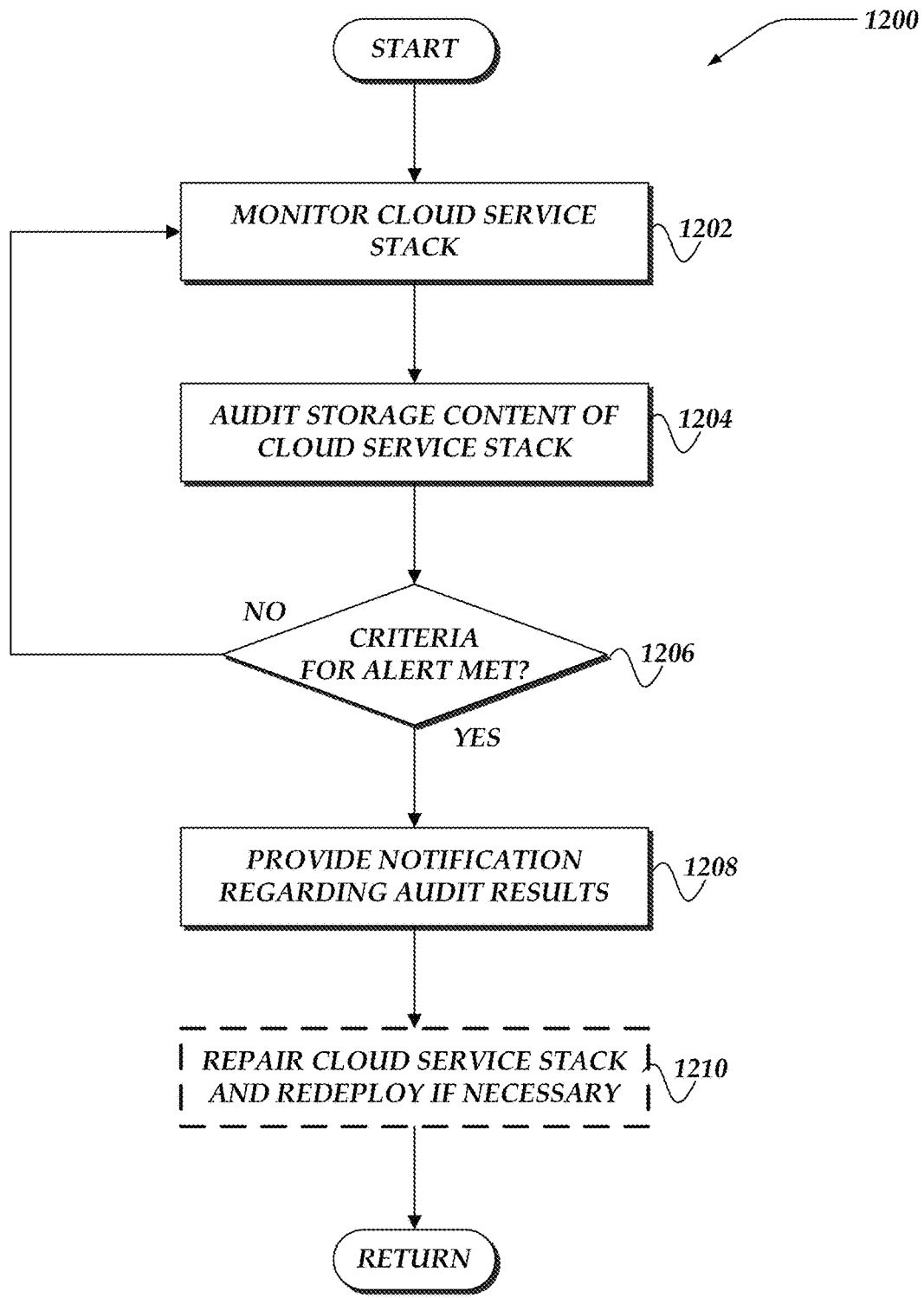
FIG. 12 illustrates an overview flowchart for a process for monitoring multi-platform cloud-based infrastructures in accordance with at least one of the various embodiments.

FIG. 12 illustrates an overview flowchart for process 1200 for monitoring multi-platform cloud-based infrastructures in accordance with at least one of the various embodiments. After a start block, at block 1202, in at least one of the various embodiments, a monitoring engine may be launched to monitor one or more cloud service stacks. In at least one of the various embodiments, the monitoring engine may collect status metrics and/or configuration information that is associated with the cloud service stack. In at least one of the various embodiments, the metrics may include information, such as, the set of TCP/IP ports/connections that are open, the set of processes that are running, network information (e.g., route tables, firewall rules, network address, or the like), user lists, or the like, or combination thereof.

At block 1204, in at least one of the various embodiments, the monitoring engine may be arranged to execute a scan of the storage contents that may be associated with a cloud service stack. In at least one of the various embodiments, one or more rule based policies may enable and/or restrict the audit to particular portions of the storage allocated to the cloud service stack. For example, the audit policies may define certain storage locations (e.g., directories, buckets, databases, or the like) that should have their content audited. Further, in at least one of the various embodiments, audit policies may define when and/or how often the audits should occur.

In at least one of the various embodiments, the audit policies may be defined in the one or more stack models that are associated with the cloud service stack. In at least one of the various embodiments, the deployment engine may generate the configuration/instructions for performing the audits from the stack models and include it in a configuration package. Accordingly, in at least one of the various embodiments, the deployment engine may provide configuration/instructions that may be particularized to a given cloud platform. For example, in some embodiments, cloud platforms may provide different types of storage classes that may be configured/accessed/audited differently. Likewise, different cloud platforms may have different ways of accessing their various storage locations.

In at least one of the various embodiments, the stack models associated with a cloud service stack may include cloud platform independent content audit rules. In some embodiments, content audit rules may include various configurable expressions for identifying allowed and/or excluded content, such as, regular expressions, feature values/thresholds (e.g., size, age, owner, permissions, content-type, or the like), heuristics, or the like, or combination thereof. In at least one of the various embodiments, one or more of these configurable expressions may be combined into compound expressions using Boolean algebra, conditional program logic, or the like.

At decision block 1206, in at least one of the various embodiments, if a criteria that indicates that an alert should be raised is met, control may flow block 1208; otherwise, control may loop back to block 1202.

At block 1208, in at least one of the various embodiments, the monitoring engine may provide the appropriate notification that may be associated with the one or more audit criteria having been met. In at least one of the various embodiments, the notification process may include: sending one or more messages, such as, an email or text to a particular user or user group; generating entries in a log file or event message queue; displaying visual notification on a user-interface that may be running on a network computer or client computer; or the like, or combination thereof.

At block 1210, in at least one of the various embodiments, optionally, the cloud service stack may be repaired and redeployed depending one or more audit policies that may be associated with the stack model for the cloud service stack. In at least one of the various embodiments, the cloud service stack may be redeployed based on the stack model. In some embodiments, some or all of the contents associated with a failed audit may be retained and/or archived so it may remain available for forensic analysis.

In at least one of the various embodiments, this block may be optional because automatic repair and/or redeploy may not always occur. In some embodiments, one or more stack models may be arranged to request confirmation from users or require other conditions that must be met before repairing/redeploying cloud service stacks. Next, in at least one of the various embodiments, control may be returned to a calling process.

Figure 13:
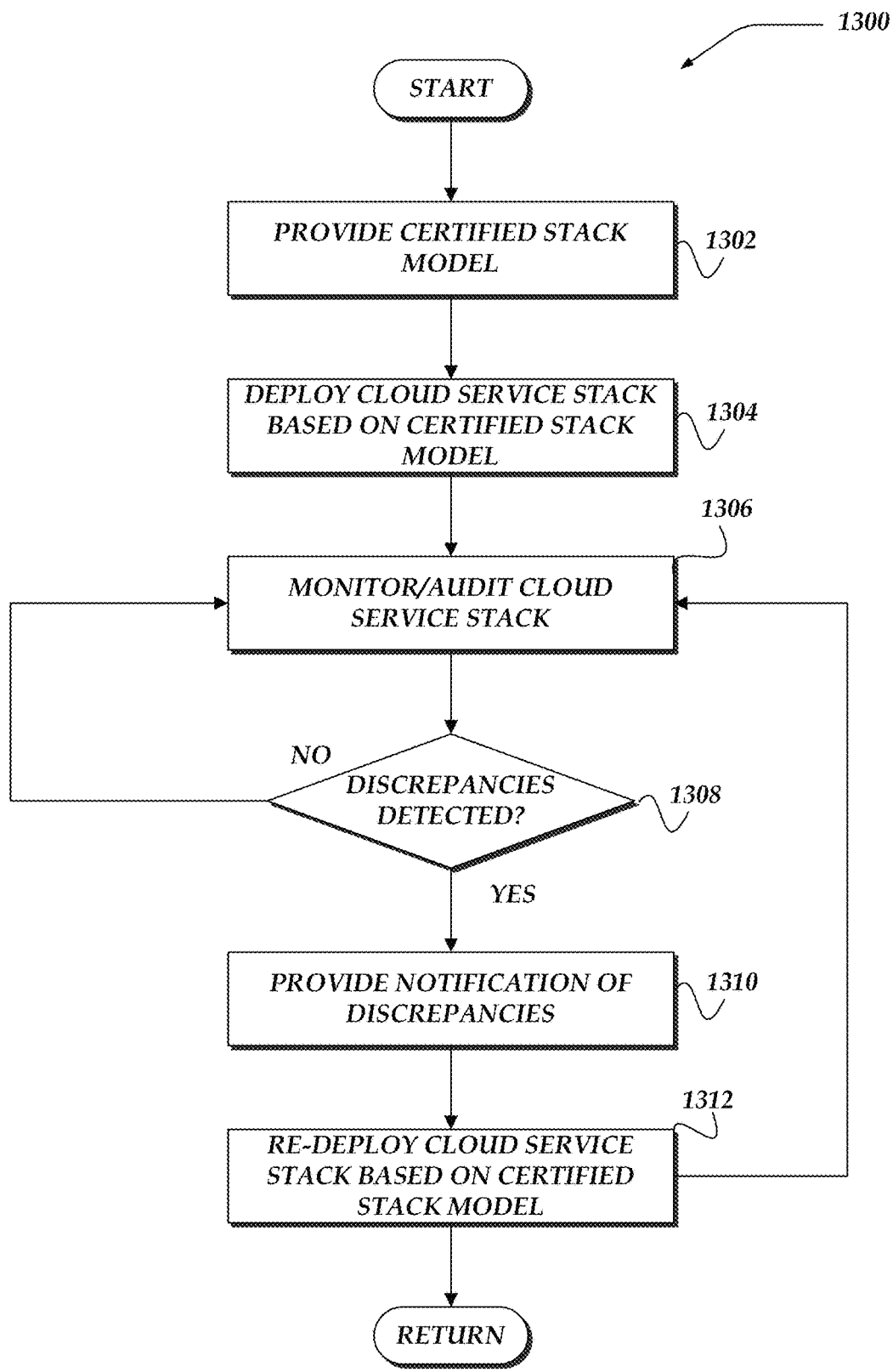
FIG. 13 illustrates an overview flowchart for a process for monitoring certified multi-platform cloud-based infrastructures in accordance with at least one of the various embodiments.

FIG. 13 illustrates an overview flowchart for process 1300 for monitoring certified multi-platform cloud-based infrastructures in accordance with at least one of the various embodiments. After a start block, at block 1302, in at least one of the various embodiments, a certified stack model may be provided by a modeling engine. In at least one of the various embodiments, various stack models may be certified by various certification organizations. In some embodiments, a particular certification may represent an acknowledgement by a certifying organization that a stack model meets one or more criteria. For example, a stack model that provides a particular type of clustering may be certified by an organization that supports or promotes correct use of the particular type of clustering. Likewise, in at least one of the various embodiments, a stack model that provides a virtual private network may be certified by one or more organizations promoting network security.

In at least one of the various embodiments, a certified stack model may be registered and/or stored in a central stack model repository. Accordingly, in at least one of the various embodiments, if a certified stack model is added to a customer's/organization's stack model, the customer/organization may advertise that some or all of their cloud service stacks are using one r more certified configurations. Further, in some embodiments, cloud service stacks compiled from certified stack models may include one or more mechanisms that allow automated interrogation regarding their certification status.

In at least one of the various embodiments, employing certified stack models enables organizations to ensure to themselves and to others that some or all of the cloud service stack is provisioned and/or configured to meet the certification standards associated with the certified stack models that are used.

In at least one of the various embodiments, as mentioned above, some parts or all of a cloud service stack may be generated from certified stack models. Accordingly, in some embodiments, the entire stack model for the cloud service stack may be a certified stack model. Alternatively, in at least one of the various embodiments, portions of the stack model of the cloud service stack may be certified stack models. For example, an ecommerce cloud service stack may use a certified stack model that provides payment processing. In this example, the payment processing provider may certify one or more stack models that may be included stack model for the ecommerce cloud service stack. Whereas, in this example, other portions of the cloud service stack may not be certified.

In other cases, in at least one of the various embodiments, for example, the entire stack model for the cloud service stack may certified. For example, a vendor such as, a cloud platform provider may offer certified stack models that customers may use for deploying their entire cloud service stack.

At block 1304, in at least one of the various embodiments, a deployment engine may deploy the cloud service stack to a cloud platform based on the certified stack models. In at least one of the various embodiments, the certified stack model may be embedded/included in a larger stack model used to provide the cloud service stack. Or, in at least one of the various embodiments, the certified stack model may be the entire stack model for the entire cloud service stack.

At block 1306, in at least one of the various embodiments, a monitoring engine may be executed to monitor and/or audit the deployed cloud service stack. As described above, monitoring engine, such as, monitoring engine 324 may be arranged to monitor the current configuration of the cloud service stack as it is running. Likewise, as described above the monitoring engine may be arranged to perform content auditing as configured the stack models.

In at least one of the various embodiments, the monitoring engine may identify configuration changes in the cloud service stack deviate from the certification criteria for one or more certified stack models that were used to produce the cloud service stack. For example, in some examples, an included certified stack model may define a secure sockets (SSL) only web server. Thus, in this example, the client users and operators of the cloud service stack may be ensured that the web servers in their cloud service stack will always use SSL to communicate—at least those web servers that are based on this certified stack model. Accordingly, in this example, if a user changes the configuration of the deployed web server to allow non-SSL connections, the monitoring engine will identify that the web server is not operating/configured to conform to the certified stack model. Note, the monitoring engine does not prevent authorized users from re-configuring the cloud service stack directly through the cloud platform tools (e.g., dashboard tools, command line interface, or the like). However, the monitoring engine does detect if the configuration of cloud service stack deviates from the stack model used to deploy it. Accordingly, the monitoring engine may enforce criteria for the certified stack models that may be used in a cloud service stack.

At decision block 1308, in at least one of the various embodiments, if discrepancies between the certified stack model and the cloud service stack are detected, control may flow to block 1310; otherwise, control may loop back to block 1306. As described above, the monitoring engine may identify one or more non-conforming configurations or resources that may in the cloud service stack.

In at least one of the various embodiments, the monitoring engine may be arranged to continuously monitor the cloud service stack. In other embodiments, monitoring engines may be configured to periodically perform monitoring actions. In at least one of the various embodiments, certified stack models may define the monitoring engine criteria such as how often the monitoring should occur. In some cases, a certified stack model may be arranged to consider failure to adequately monitor a cloud service stack as a non-conforming issue that violates the certification criteria.

At block 1310, in at least one of the various embodiments, one or more notifications may be provided to notify the responsible parties of the discovered non-conformities. In some embodiments, the actual notification methods/mechanism may be defined by the certified stack model. For example, the payment processing vendor described above, may arrange their certified stack models to notify them if certain non-conformities are discovered by the monitoring engine. In this example, such notifications may enable the vendor to take steps on its end to prevent harm or other security breaches from impacting its systems.

At block 1312, in at least one of the various embodiments, the deployment engine may be arranged to automatically re-deploy the cloud service stacks that may be determined to have non-conforming "certified" stack models. For example, if the web server described above is found to be non-conforming, the deployment engine may re-deploy the web-servers using the certified stack model. Next, in at least one of the various embodiments, control may be returned to a calling process.

Figure 14:
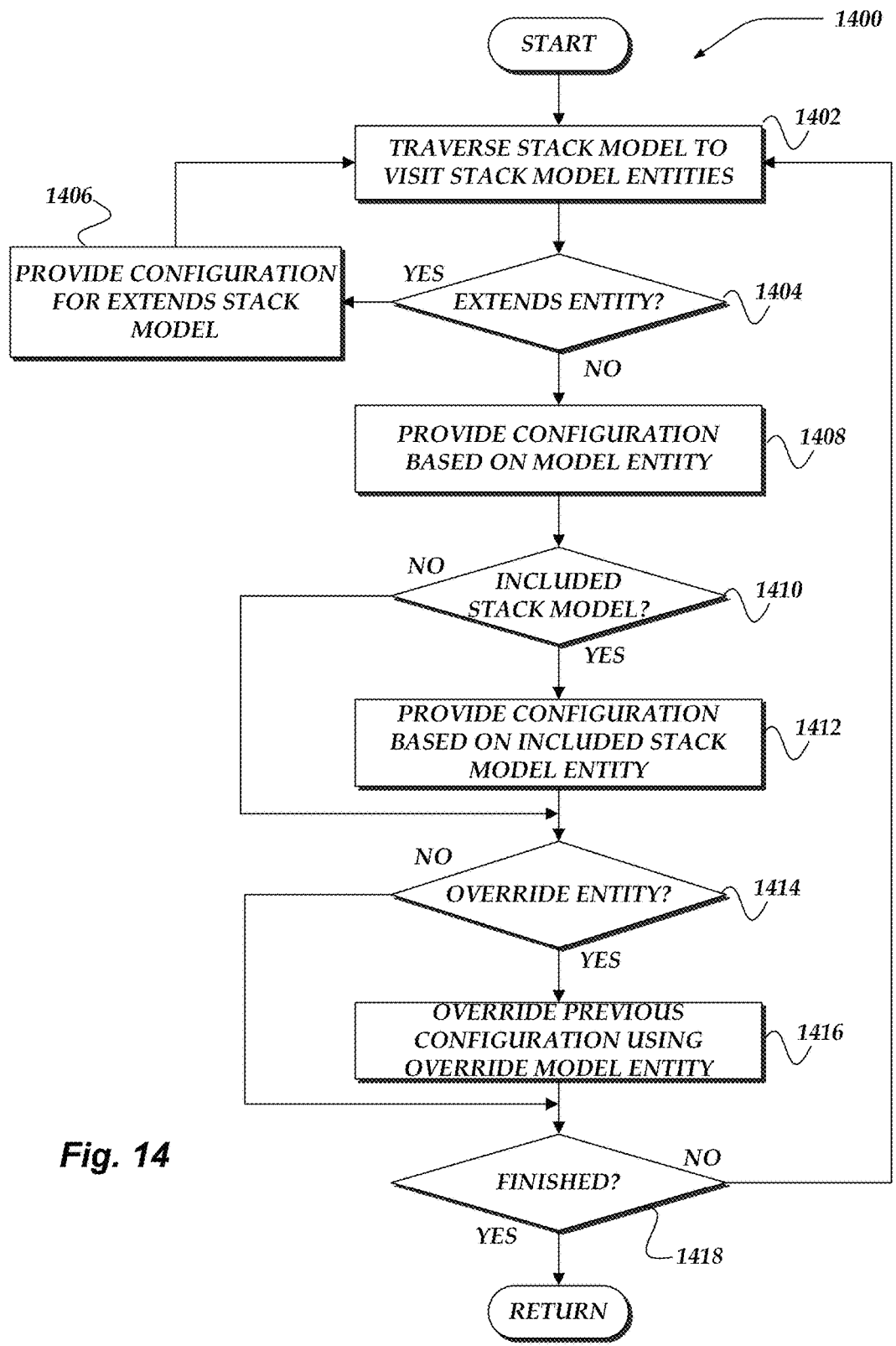
FIG. 14 illustrates a flowchart for a process for traversing a stack model to provide configuration information for cloud service stack in accordance with at least one of the various embodiments.

FIG. 14 illustrates a flowchart for process 1400 for traversing a stack model to provide a configuration package for cloud service stack in accordance with at least one of the various embodiments. After a start block, at block 1402, in at least one of the various embodiments, a deployment engine may be launched to traverse a stack model to visit the one or more stack model entities that comprise the stack model. As described above, in at least one of the various embodiments, a stack model may represent resources and/or configuration information that may be included in a cloud service stack. In at least one of the various embodiments, stack model entities may be considered the nodes of the stack model graph and the relationships between the nodes may be represented as edges of the stack model graph.

Accordingly, in at least one of the various embodiments, the deployment engine may be arranged to traverse the stack models to provide configuration packages that may be arranged to produce cloud service stacks. As shown in FIG. 6, stack model may embed other stack models. Thus, in some embodiments, if a deployment engine encounters the root of another stack model it may traverse that other stack model as well.

At decision block 1404, in at least one of the various embodiments, if the deployment engine encounters an extends entity, control may flow to block 1406; otherwise, control may flow to block 1406. As described above, in some embodiments, stack model entities may represent other stack models or in the case of extends entities they may reference other stack models that are not physically included in the stack mode being processed.

At block 1406, in at least one of the various embodiments, since the stack model entity is an extends entity that references another stack model, the deployment engine may locate the referenced stack model and traverse it to generate configuration information that corresponds the referenced stack model. In at least one of the various embodiments, if a stack model includes an extends entity it may be the first stack model entity processed by the deployment engine.

At block 1408, in at least one of the various embodiments, the deployment engine may provide configuration information for a configuration package based on the visited stack model entity and the targeted cloud platform. In at least one of the various embodiments, the deployment engine may generate configuration information that if provided to the targeted cloud platform will create, provision, and configure the resources necessary to implement a cloud service stack that corresponds to stack model. In some embodiments, during the processing of the stack model, the configuration information may be held in local temporary storage/memory that enables the deployment engine to manipulate (e.g., post-process) the configuration information after it is originally generated. (See, the override entity discussion below in block 1416)

In at least one of the various embodiments, the particular configuration information that the deployment engine provides may be determined by a mapping from stack model entities features to particular cloud platform features and the particular configuration information/instructions that may be required to deploy those features on the targeted cloud platform.

For example, briefly referring back to FIG. 7, stack model entity 706 includes resource definitions that define a cluster of cloud instances to be deployed on a cloud platform. In some embodiment, the stack model entity may include cloud platform independent definitions (e.g., block 712) that the deployment engine may use to provide cloud platform specific configuration information.

In at least one of the various embodiments, different cloud platforms may implement different resources. In some cases, in one cloud platform there may be one-to-one mapping between resources defined in the model entity and the cloud platform. However, in some cloud platforms there may be resources that do not directly correspond to the resource definition. Accordingly, in at least one of the various embodiments, the deployment engine may be arranged to generate one or more substitute resources and/or substitute configurations for a particular cloud platform.

In at least one of the various embodiments, the deployment engine may be arranged to locate and employ another stack model that may provide the same functionality as defined in the stack model for a particular cloud platform. Accordingly, in some embodiments, a single line/block definition in a stack model entity may be expanded into another stack model that may be subsequently processed by the deployment engine to produce the configuration information for the cloud service stack.

For example, block 712 in FIG. 7 includes cloud platform independent instructions for provisioning a cluster of cloud instances on a cloud platform. Cloud Platform A may provide an interface that enables the deployment engine to produce a single block of configuration information to produce cluster of cloud instances on the cloud platform—not unlike the resource definition itself. Whereas, Cloud Platform B may not provide a notion of a cluster resource. Accordingly, in this example, the deployment engine may be arranged to generate the necessary configuration information to create a cluster of cloud instances on Cloud Platform B. For example, the deployment engine may be arranged to produce configuration information for the various components necessary for a cluster, such as: provisioning a number of separate virtual machines; network configuration that puts each machine in the same subnet; configuring the private/public access of the subnet; configuring a shared security certificate for use by the separate virtual machines; or the like.

As mentioned, in some cases, the configuration information required to express the resource on one or more particular cloud platforms may be so complex as to require its own stack model. Alternatively, in at least one of the various embodiments, for other cloud platforms a single line or block of configuration information may be all that is needed.

In at least one of the various embodiments, some stack model entities may include definitions for configuring previously defined resources. In some embodiments, such model entities may include scripts, programs, or the like, that may be need to be applied/executed during the startup and/or shutdown the cloud service stack. In some embodiments, startup model entities may include one or more scripts, programs, or the like, the may be executed at start or boot of the cloud service stack. In some embodiments, the startup scripts/program may be configured to be executed by a cloud management agent that may be included in one or more cloud instances. Similarly, in some embodiments, shutdown model entities may define action that may be performed if a cloud service stack is shutting down.

In at least one of the various embodiments, model entities that define scripts or programs may be arranged to select different scripts or programs depending on the target cloud platform. In some embodiments, a model entity may define a set of scripts/programs for each potentially targeted cloud platform. Accordingly, in at least one of the various embodiments, during deployment the deployment engine may select the set of scripts/programs that correspond to the target cloud platform.

At decision block 1410, in at least one of the various embodiments, if the visited model entity is the root of an included stack model, control may flow to block 1412; otherwise, control may flow to decision block 1414.

At block 1412, in at least one of the various embodiments, since the visited stack model entity is a root of an included stack mode, the deployment engine may begin traversing the included stack model and visiting its stack model entities to produce the appropriate configuration information.

At decision block 1414, in at least one of the various embodiments, if the visited stack model entity is an override entity, control may flow to block 1416; otherwise, control may flow to decision block 1418.

At block 1416, in at least one of the various embodiments, the previously generated configuration information may be overridden based on definition included in the override entity. In at least one of the various embodiments, each visited model entity may provide configuration information that is temporarily stored by the deployment engine. Accordingly, in some embodiments, if an override entity is visited by the deployment engine, it may include definitions that may be used to supplement or replace previously generated configuration information.

In at least one of the various embodiments, override entities enables a user modify portions of the configuration for included stack models and/or extended stack models. For example, a simple main stack model may include a pre-defined stack model that defines a web server. Thus, in this example, the main stack model may also include override entities that modify the web server definitions.

In at least one of the various embodiments, override entities enable a user to customize the stack models that are included in their own main stack models. The override entity may include definition/instructions to replace features, settings, labels, names, or the like, that were defined by an included stack model. In at least one of the various embodiments, the deployment engine may process the override entity to modify the configuration information for the cloud service stack.

For example, a main stack model may include a stack model for provisioning a generic cloud instance (virtual machine). Further, the main stack model may include an override entity that configures one or more features of the cloud instance and/or installs one or more applications on the generic cloud instance. Thus, in this example, the user may gain the benefits of using well defined/well-known stack models and then modifying them as needed using override entities.

Note, in at least one of the various embodiments, certified stack models, as described above, may provide restrictions on the features that may be overridden. Accordingly, certified stack models may have one or more features/definition tagged as immutable or required. In some embodiments, trying to override immutable features using an override entity may cause the deployment engine to abort it traversal of the stack model. Similarly, required features/definitions may overridden at the expense of disqualifying the certification status of the included stack model.

At decision block 1418, in at least one of the various embodiments, if the deployment engine has finished traversing the stack model, control may be returned to a calling process; otherwise, control may loop back to block 1402 to continue traversing stack model and visiting stack model entities.

Figure 15:
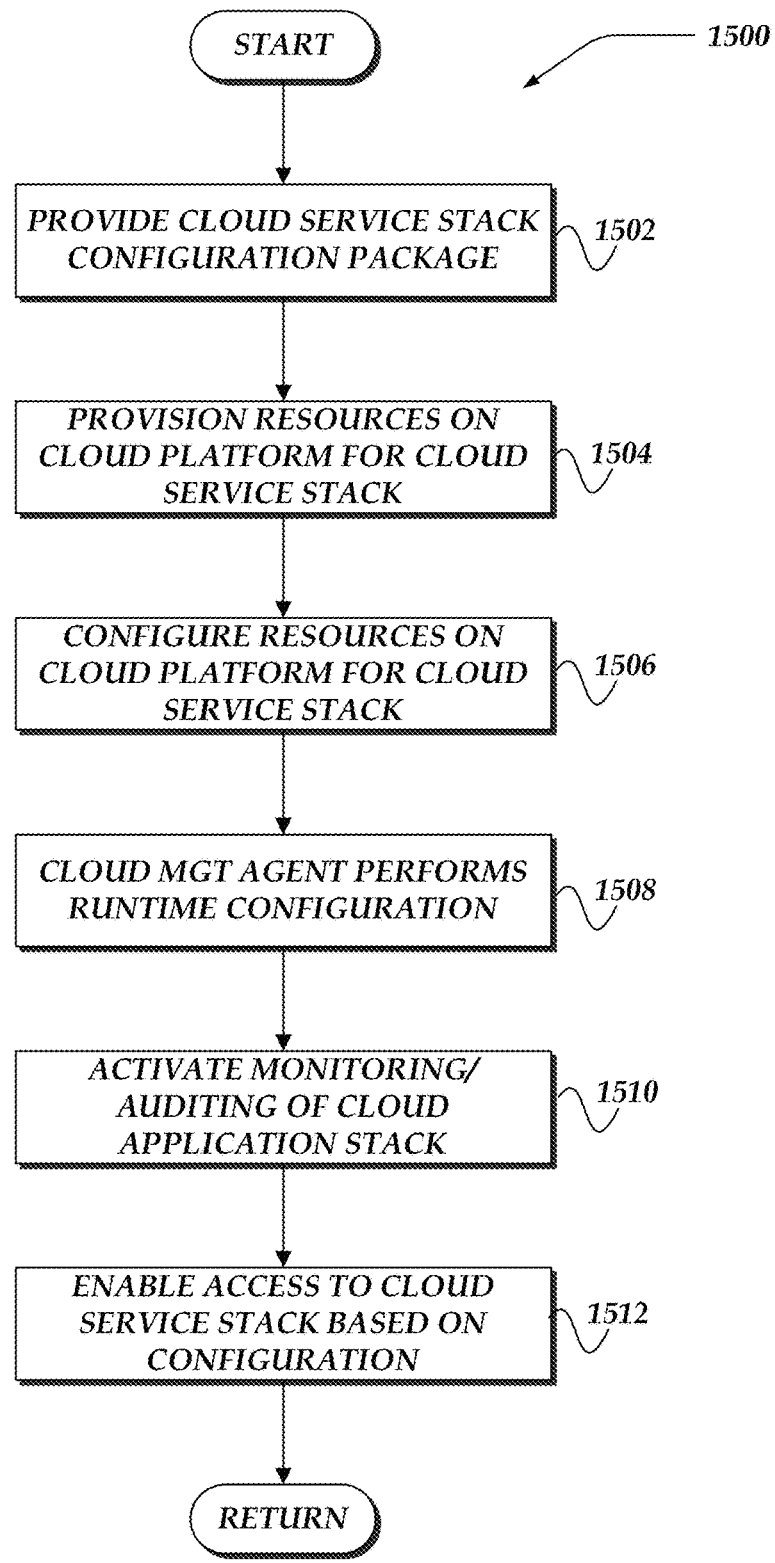
FIG. 15 illustrates a flowchart for a process for deploying a cloud service stack in accordance with at least one of the various embodiments.

FIG. 15 illustrates a flowchart for process 1500 for deploying a cloud service stack in accordance with at least one of the various embodiments. After a start block, at block 1502, in at least one of the various embodiments, the deployment engine may provide the configuration package for a cloud service stack to the targeted cloud platform. As described, the deployment engine may provide configuration information based on the stack model for the cloud service stack and include it in the configuration package.

At block 1504, in at least one of the various embodiments, in at least one of the various embodiments, resources for the cloud service stack may be provisioned on the cloud platform. In at least one of the various embodiments, the configuration information that was generated by the deployment engine may include cloud platform specific configuration instructions that create and/or provision the resources defined by the stack models that correspond to the cloud service stack.

At block 1506, in at least one of the various embodiments, resources that are provisioned on the cloud service stack may be configured. In at least one of the various embodiments, the configuration information that was generated by the deployment engine may include cloud platform specific configuration instructions that configure the resources defined by the stack models that correspond to the cloud service stack. In some embodiments, the provisioning and configuration may occur in the same step, depending on how a cloud platform defines the particular resources and how it enables configuring. For example, in some embodiments, certain resources may need to exist in the cloud platform before some or all of the configuration may proceed.

At block 1508, in at least one of the various embodiments, cloud management agents that may include executing on one or more cloud instances and/or virtual machines may perform runtime configurations. In some embodiments, this may include installing software packages, setting security policies, creating local users, setting network policies, starting processes, or the like, or combination thereof.

At block 1510, in at least one of the various embodiments, a monitoring engine may began monitoring and/or auditing the deployed cloud service stack to ensure it conforms to policies and configuration standard that may have been established by its corresponding stack models.

At block 1512, in at least one of the various embodiments, the cloud server stack may be configured to enable access by users. In at least one of the various embodiments, if the configuration and setup of the cloud service stack is complete, the cloud service stack may be made available to perform the one or more actions defined by its stack models. Next, in at least one of the various embodiments, control may be returned to a calling process.

Figure 16:
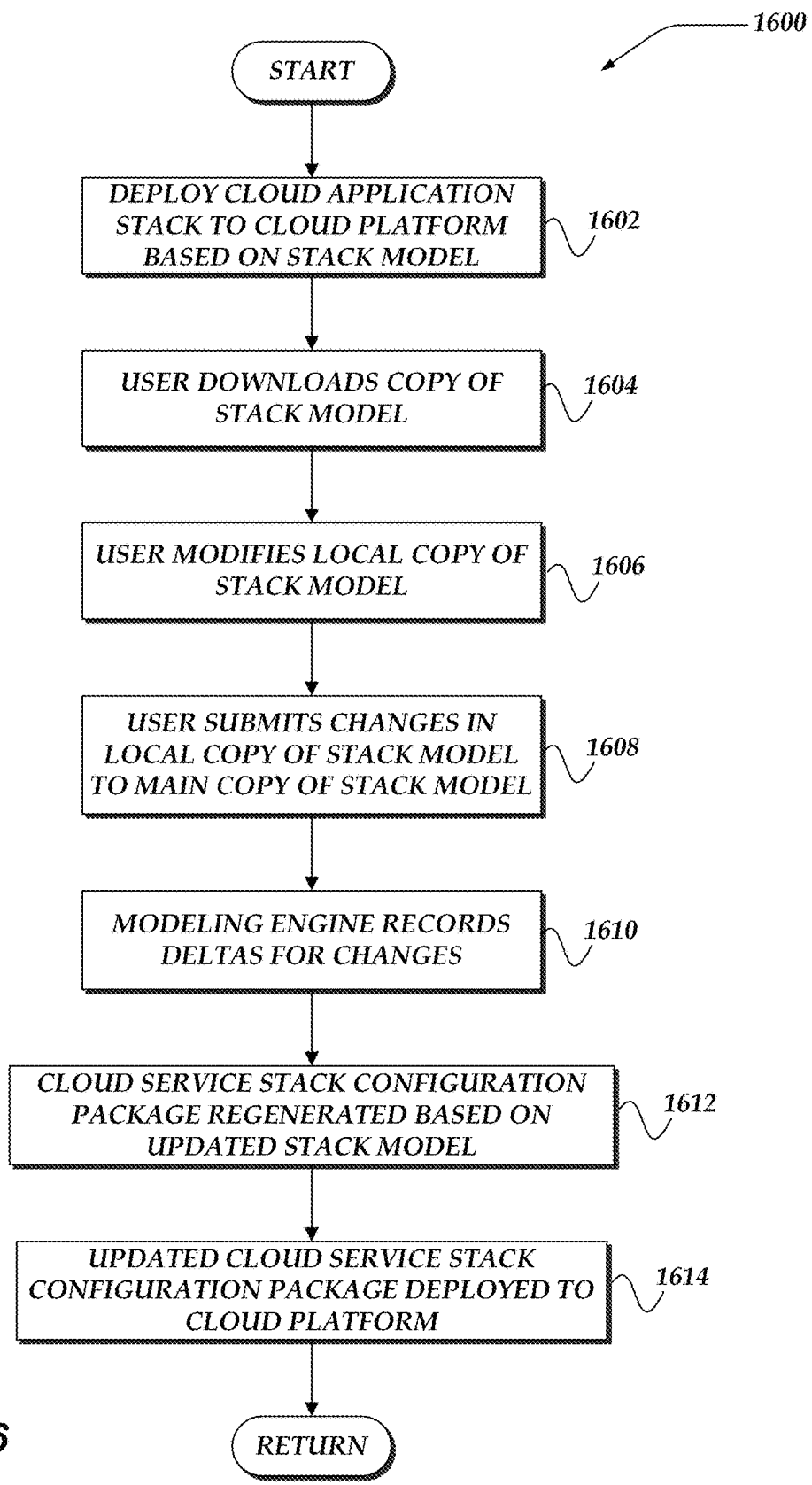
FIG. 16 illustrates a flowchart for a process for working with stack models in accordance with at least one of the various embodiments.

FIG. 16 illustrates a flowchart for process 1600 for working with stack models in accordance with at least one of the various embodiments. After a start block, at block 1602, in at least one of the various embodiments, a described above, a deployment engine may deploy a cloud service stack to a cloud platform based on a stack model.

At block 1604, in at least one of the various embodiments, a user, such as, a developer, network administer, or the like, may download a local copy of the stack model that corresponds to the deployed cloud service stack. In at least one of the various embodiments, if a stack model includes other stack models, those stack model may be downloaded as well. In some embodiments, stack models that are reference in stack model (e.g., via extends entities) may remain in their home stack model repositories.

At block 1606, in at least one of the various embodiments, the user may make changes to the stack model. In at least one of the various embodiments, the user may modify the stack model by performing various actions, such as, modify individual stack model entities, add/modify/remove stack models, add/modify/remove extends model entities, add/modify/remove override entities, or the like, or combination thereof.

At block 1608, in at least one of the various embodiments, the user may submit the changes made in the local copy of the stack model to the stack model repository that is associated with the stack model.

At block 1610, in at least one of the various embodiments, the modeling engine may be arranged to track a history of updates (e.g., changes, deletes, additions, or the like) and associate an identifier corresponding to the user with each update. Further, in some embodiments, the modeling engine may record the time and date of when the update was added to the stack model repository.

At block 1612, in at least one of the various embodiments, a deployment engine may generate an updated configuration package that includes configuration information for the cloud service stack based on the updates that are provided to the stack model repository.

At block 1614, in at least one of the various embodiments, the updated configuration package for the cloud service stack may be deployed to the cloud platform. In at least one of the various embodiments, the deployment engine may automatically deploy the configuration package to the cloud platform. In at least one of the various embodiments, the deployment engine may wait until a user or operator provides authorization to perform the deployment. In some embodiments, the stack model may include deployment policy rules that the deployment engine may apply. For example, in at least one of the various embodiments, a stack model may have a deployment policy that restricts automatic re-deployment to certain times (e.g., Sundays after 9*pm*) Likewise, in some cases, a deployment policy may require additional authorization to re-deploy a cloud server stack outside of prescribed times. Next, control may be returned to calling process.

Figure 17:
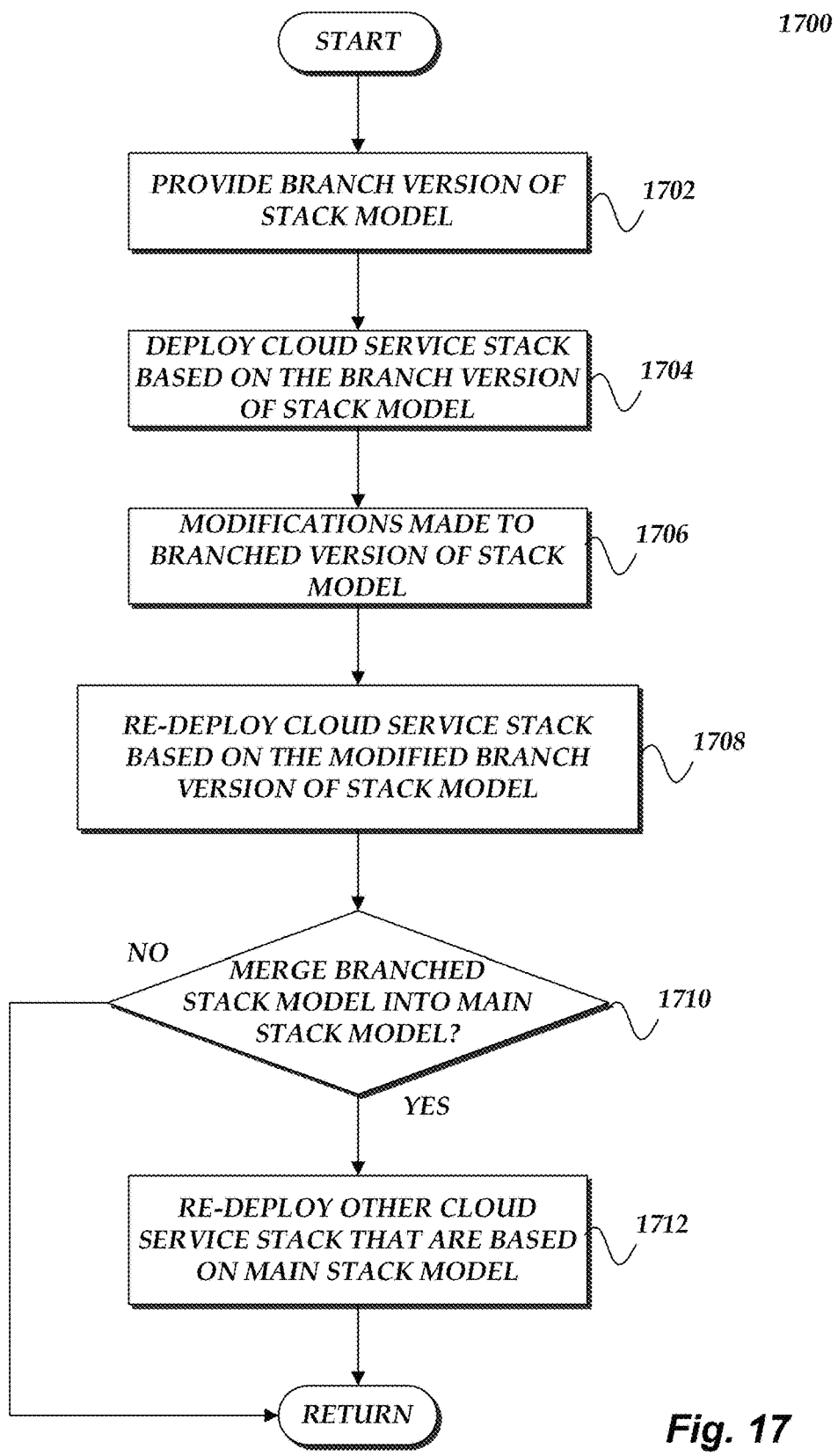
FIG. 17 illustrates a flowchart for a process for working with stack model version in accordance with at least one of the various embodiments.

FIG. 17 illustrates a flowchart for process 1700 for working with stack model version in accordance with at least one of the various embodiments. After a start block, at block 1702, in at least one of the various embodiments, a branch version of a stack model may be provided. In at least one of the various embodiments, stack model repositories may be arranged to maintain a record of each change that may be made to stack models. In some embodiments, a user may label or tag a particular version of a stack model. In some embodiments, the labels propagate down to each stack model entities in the stack model. Accordingly, in at least one of the various embodiments, a particular version of a stack model that corresponds to a label may be retrieved from the repositories by providing the appropriate label. Likewise, retrieving a stack model from a repository without using a label may retrieve the latest version of the stack model and its stack model entities.

In at least one of the various embodiments, labels may be used to define version branches of a stack model. Branches may be arranged to enable changes to be made to the branch without affecting the main line of the stack model. Accordingly, changes made to a branch may remain in the branch until the branch changes are merged into the main line of the stack model.

At block 1704, in at least one of the various embodiments, a deployment engine may deploy a cloud service stack based on the branch version of the stack model. In at least one of the various embodiments, the deployment engine may be provide a configuration package based on a traversal of the stack model branch version. In some embodiments, the branch version of the stack model may be pulled from a stack model repository. Accordingly, the stack model and its stack model entities that are traversed by the deployment engine will be the associated with the particular branch version that is provided. In at least one of the various embodiments, the configuration package corresponding the branch version may be provided to the cloud platform and a cloud service stack may be provisioned and configured.

At block 1706, in at least one of the various embodiments, modifications may be made to a branch version of a stack model, separate from modifying the main line version. Likewise, in at least one of the various embodiments, modifications made to the main line version of the stack model may be made without altering the branch version stack model.

At block 1708, in at least one of the various embodiments, the monitoring engine may identify that the branch version of the stack model includes changes that may be not in the deployed cloud service stack. Accordingly, in at least one of the various embodiments, the deployment engine may generate an updated configuration package that may be deployed on the cloud platform. In at least one of the various embodiments, the updated configuration package may be generated by traversing the branch version of the stack model. Accordingly, changes made to other branches or the main line will not be reflected in the configuration package.

At decision block 1710, in at least one of the various embodiments, if the branch version of the stack model is to be merged into the main line of the stack model, control may flow to block 1712; otherwise, control may be returned to a calling process. In at least one of the various embodiments, branch versions of stack models may be merged back into the main line, or they may be merged into other branches. Likewise, in some embodiments, other branch versions may be merged into a branched version of a stack model.

At block 1712, in at least one of the various embodiments, the monitoring engine may determine other cloud server stack that are based on the main line stack model need to be updated. Accordingly, in at least one of the various embodiments, the deployment engine may be arranged to traverse the main line stack model to provide an updated configuration package.

In at least one of the various embodiments, the updated configuration package may be deployed to one or more cloud platforms to update the cloud service stacks that are based on the now modified stack model. Next, control may be returned to a calling process.

It will be understood that each block of the flowchart illustration, and combinations of blocks in the flowchart illustration, can be implemented by computer program instructions. These program instructions may be provided to one or more processors, including one or more special purpose processers to produce a machine, such that the instructions, which execute on the one or more processors, create means for implementing the actions specified in the flowchart block or blocks. The computer program instructions may be executed by the one or more processors to cause a series of operational steps to be performed by the one or more processors to produce a computer-implemented process such that the instructions, which execute on the one or more processors to provide steps for implementing the actions specified in the flowchart block or blocks. The computer program instructions may also cause at least some of the one or more processors to perform the operational steps shown in the blocks of the flowchart in parallel. Moreover, some of the steps may also be performed across more than one processor, such as might arise in a multi-processor computer system and/or multi-core hardware processor. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of actions for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Further, in one or more embodiments (not shown in the figures), the logic in the illustrative flowcharts may be executed using one or more embedded logic hardware devices instead of a CPU, such as, an Application Specific Integrated Circuit (ASIC), Field Programmable Gate Array (FPGA), Programmable Array Logic (PAL), or the like, or combination thereof. The one or more embedded logic hardware devices may directly execute embedded logic to perform actions described above. In at least one embodiment, one or more microcontrollers may be arranged to directly execute their own embedded logic to perform actions and access their own internal memory and their own external Input and Output Interfaces (e.g., hardware pins and/or wireless transceivers) to perform actions, such as System On a Chip (SOC), or the like.

What is claimed is:

1. A computer-implemented method for managing computer stacks, the method comprising:
   providing a configuration package to provision a cloud service stack on a cloud platform, wherein the cloud service stack corresponds to a main stack model that is stored in a stack model repository and wherein the configuration package is based on the main stack model; and
   when at least one of inconsistency and potential resource use optimization between the cloud service stack and the main stack model is identified, executing a process, the process including:
      traversing the main stack model, including visiting each stack model entity included in the main stack model;
      updating the configuration package based on the traversal of the main stack model; and
      providing the updated configuration package to the cloud platform, wherein the updated configuration package is used to re-provision the cloud service stack.

2. The method of claim 1, wherein traversing the main stack model includes, when a stack model entity that is a root of another stack model is visited, performing steps comprising:
   traversing the other stack model; and
   modifying the updated configuration package for the cloud platform based on the traversal of the other stack model.

3. The method of claim 1, further comprising:
   providing a local copy of the main stack model to a user, wherein the user is enabled to modify the local copy of the main stack model; and
   providing the user's local copy of the main stack model to the stack model repository, wherein modifications made to the user's local copy of the main stack model are merged into the main stack model.

4. The method of claim 1, wherein providing the updated configuration package comprises:
   assembling instructions that are specific to the cloud platform based on one or more definitions that are included in each stack model entity of the main stack model; and
   providing one or more portions of the configuration package based on the assembled instructions.

5. The method of claim 1, wherein providing the configuration package to provision the cloud service stack comprises:
   provisioning one or more cloud instances, wherein the one or more cloud instances include a cloud management agent;
   employing the cloud management agent to monitor one or more metrics of the one or more cloud instances; and
   employing the cloud management agent to perform configuration actions on the one or more cloud instances.

6. The method of claim 1, further comprising:
   comparing resource utilization of the cloud service stack with current prices of the cloud platform; and
   when the comparison identifies one or more cost optimizations, modifying the main stack model based on the one or more cost optimizations.

7. The method of claim 1, further comprising:
   auditing content of the cloud service stack; and
   when the audit identifies that one or more defined conditions are met, providing one or more notifications to alert one or more users.

8. The method of claim 1, wherein traversing the main stack model further includes, when a stack model entity that is an override stack model entity is visited, modifying the updated configuration package by at least one of adding information or replacing information based on the override stack model entity.

9. A non-transitory computer-readable storage medium containing program instructions for managing computer stacks, wherein execution of the program instructions by one or more processors of a computer system causes the one or more processors to perform steps comprising:
   providing a configuration package to provision a cloud service stack on a cloud platform, wherein the cloud service stack corresponds to a main stack model that is stored in a stack model repository and wherein the configuration package is based on the main stack model; and
   when at least one of inconsistency and potential resource use optimization between the cloud service stack and the main stack model is identified, executing a process, the process including:
      traversing the main stack model, including visiting each stack model entity included in the main stack model;
      updating the configuration package based on the traversal of the main stack model; and providing the updated configuration package to the cloud platform, wherein the updated configuration package is used to re-provision the cloud service stack.

10. The computer-readable storage medium of claim 9, wherein traversing the main stack model includes, when a stack model entity that is a root of another stack model is visited, performing steps comprising:
    traversing the other stack model; and
    modifying the updated configuration package for the cloud platform based on the traversal of the other stack model.

11. The computer-readable storage medium of claim 9, further comprising:
    providing a local copy of the main stack model to a user, wherein the user is enabled to modify the local copy of the main stack model; and
    providing the user's local copy of the main stack model to the stack model repository, wherein modifications made to the user's local copy of the main stack model are merged into the main stack model.

12. The computer-readable storage medium of claim 9, wherein providing the updated configuration package comprises:
    assembling instructions that are specific to the cloud platform based on one or more definitions that are included in each stack model entity of the main stack model; and
    providing one or more portions of the configuration package based on the assembled instructions.

13. The computer-readable storage medium of claim 9, wherein providing the configuration package to provision the cloud service stack comprises:
    provisioning one or more cloud instances, wherein the one or more cloud instances include a cloud management agent;
    employing the cloud management agent to monitor one or more metrics of the one or more cloud instances; and
    employing the cloud management agent to perform configuration actions on the one or more cloud instances.

14. The computer-readable storage medium of claim 9, further comprising:
    comparing resource utilization of the cloud service stack with current prices of the cloud platform; and
    when the comparison identifies one or more cost optimizations, modifying the main stack model based on the one or more cost optimizations.

15. The computer-readable storage medium of claim 9, further comprising:
    auditing content of the cloud service stack; and
    when the audit identifies that one or more defined conditions are met, providing one or more notifications to alert one or more users.

16. The computer-readable storage medium of claim 9, wherein traversing the main stack model further includes, when a stack model entity that is an override stack model entity is visited, modifying the updated configuration package by at least one of adding information or replacing information based on the override stack model entity.

17. A network computer comprising:
    a transceiver that communicates over a network;
    memory that stores at least instructions; and
    at least one processor device that executes the instructions to:
        provide a configuration package to provision a cloud service stack on a cloud platform, wherein the cloud service stack corresponds to a main stack model that is stored in a stack model repository and wherein the configuration package is based on the main stack model; and
        when at least one of inconsistency and potential resource use optimization between the cloud service stack and the main stack model is identified, execute a process, the process including:
            traversing the main stack model, including visiting each stack model entity included in the main stack model;
            updating the configuration package based on the traversal of the main stack model; and
            providing the updated configuration package to the cloud platform, wherein the updated configuration package is used to re-provision the cloud service stack.

18. The network computer of claim 17, wherein the at least one processor device is configured to, when a stack model entity that is a root of another stack model is visited:
    traverse the other stack model; and
    modify the updated configuration package for the cloud platform based on the traversal of the other stack model.

19. The network computer of claim 17, wherein the at least one processor device is configured to:
    provide a local copy of the main stack model to a user, wherein the user is enabled to modify the local copy of the main stack model; and
    provide the user's local copy of the main stack model to the stack model repository, wherein modifications made to the user's local copy of the main stack model are merged into the main stack model.

20. The network computer of claim 17, wherein the at least one processor device is configured to:
    provision one or more cloud instances, wherein the one or more cloud instances include a cloud management agent;
    employ the cloud management agent to monitor one or more metrics of the one or more cloud instances; and
    employ the cloud management agent to perform configuration actions on the one or more cloud instances.

21. The network computer of claim 17, wherein the at least one processor device is configured to, when a stack model entity that is an override stack model entity is visited, modify the updated configuration package by at least one of adding information or replacing information based on the override stack model entity.

* * * * *